United States Patent
Okumura

(10) Patent No.: US 10,757,382 B2
(45) Date of Patent: Aug. 25, 2020

(54) PROJECTION APPARATUS AND INTERFACE APPARATUS

(71) Applicant: NEC Corporation, Minato-ku, Tokyo (JP)

(72) Inventor: Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 225 days.

(21) Appl. No.: 15/533,426

(22) PCT Filed: Nov. 18, 2015

(86) PCT No.: PCT/JP2015/005763
§ 371 (c)(1),
(2) Date: Jun. 6, 2017

(87) PCT Pub. No.: WO2016/098281
PCT Pub. Date: Jun. 23, 2016

(65) Prior Publication Data
US 2017/0339378 A1    Nov. 23, 2017

(30) Foreign Application Priority Data

Dec. 18, 2014 (JP) ................................. 2014-255666

(51) Int. Cl.
*H04N 9/31* (2006.01)
*G03B 33/06* (2006.01)
(Continued)

(52) U.S. Cl.
CPC ............. *H04N 9/317* (2013.01); *G02B 5/003* (2013.01); *G02B 27/141* (2013.01);
(Continued)

(58) Field of Classification Search
CPC .... H04N 9/317; H04N 9/3161; H04N 9/3194; H04N 9/3164; G06F 3/0304; G06F 3/017;
(Continued)

(56) References Cited

U.S. PATENT DOCUMENTS 5,600,485 A * 2/1997 Iwaki ...................... G02F 1/135
                                            359/561
5,627,678 A * 5/1997 Nishii .................... G02B 27/46
                                            359/559

(Continued)

FOREIGN PATENT DOCUMENTS

JP        2002-023107 A        1/2002
JP        2002-174796 A        6/2002
(Continued)

OTHER PUBLICATIONS

C S. Pinhanez, "Everywhere Displays Projector: A Device to Create Ubiquitous Graphical Interfaces", IBM Thomas Watson Research Center, UbiComp '01 Proceedings of the 3rd international conference on Ubiquitous, pp. 315-331, Sep. 30-Oct. 2, 2001, Atlanta, Georgia.

(Continued)

*Primary Examiner* — Grant Sitta

(57) ABSTRACT

Provided are a projection apparatus and an interface apparatus that have a small size and low power consumption and can perform high-resolution multicolor display, without color breakup. The projection apparatus includes a light source emitting laser beams of a plurality of colors, a modulation means that has a phase-modulation-type modulation element including display regions corresponding to each color of the laser beams of the plurality of colors emitted from the light source and modulates incident laser beams, an unnecessary component removal means that removes the unnecessary components, which are generated by the modulation of laser beams of other colors mixed in the display regions corresponding to the laser beams of the plurality of colors, from the laser beams modulated by the modulation means using wavelength selection; and a projection means that projects light from which the unnecessary (Continued)

components have been removed by the unnecessary component removal means.

10 Claims, 25 Drawing Sheets

(51) Int. Cl.
| | |
|---|---|
| *G03B 21/00* | (2006.01) |
| *G06F 3/03* | (2006.01) |
| *G06F 3/01* | (2006.01) |
| *G02B 5/00* | (2006.01) |
| *G02B 27/14* | (2006.01) |
| *G03B 21/28* | (2006.01) |
| *G06F 3/042* | (2006.01) |
| *G06Q 10/08* | (2012.01) |

(52) U.S. Cl.
CPC ............ *G03B 21/005* (2013.01); *G03B 21/28* (2013.01); *G03B 33/06* (2013.01); *G06F 3/017* (2013.01); *G06F 3/0304* (2013.01); *G06F 3/0425* (2013.01); *H04N 9/3161* (2013.01); *H04N 9/3164* (2013.01); *H04N 9/3194* (2013.01); *G06Q 10/087* (2013.01)

(58) Field of Classification Search
CPC ..... G06F 3/0425; G02B 5/003; G02B 27/141; G03B 33/06; G03B 21/005; G03B 21/28; G06Q 10/087
See application file for complete search history.

(56) References Cited

U.S. PATENT DOCUMENTS

| | | | | |
|---|---|---|---|---|
| 6,411,425 | B1 | 6/2002 | Kowarz et al. | |
| 8,585,208 | B2* | 11/2013 | Akiyama | G03B 21/2013 353/31 |
| 8,851,681 | B2* | 10/2014 | Oiwa | G02B 27/48 353/20 |
| 8,998,424 | B2* | 4/2015 | Kilcher | G02B 26/0833 353/31 |
| 9,466,941 | B2* | 10/2016 | Janssens | G02B 27/283 |
| 2006/0152436 | A1 | 7/2006 | Kowarz | |
| 2006/0181682 | A1* | 8/2006 | Miller | H04N 9/3129 353/30 |
| 2007/0019909 | A1* | 1/2007 | Yamauchi | G02B 27/1093 385/37 |
| 2007/0206258 | A1* | 9/2007 | Malyak | G02B 26/105 345/204 |
| 2008/0094616 | A1* | 4/2008 | Tanaka | G01N 21/8803 356/237.2 |
| 2008/0175129 | A1* | 7/2008 | Tanaka | G11B 7/1353 369/112.23 |
| 2008/0231925 | A1* | 9/2008 | Tateishi | G11B 7/0065 359/21 |
| 2009/0103151 | A1 | 4/2009 | Horikawa | |
| 2009/0109405 | A1* | 4/2009 | Horikawa | G03H 1/2294 353/31 |
| 2009/0185141 | A1 | 7/2009 | Chen et al. | |
| 2009/0201498 | A1* | 8/2009 | Raskar | G01J 3/02 356/310 |
| 2009/0257028 | A1 | 10/2009 | Osawa et al. | |
| 2010/0046057 | A1* | 2/2010 | Shyu | G02B 26/105 359/206.1 |
| 2010/0231862 | A1* | 9/2010 | Itoh | G02B 27/0994 353/31 |
| 2010/0245773 | A1* | 9/2010 | Arita | G02B 27/1033 353/31 |
| 2011/0002019 | A1* | 1/2011 | Routley | G02B 27/48 359/9 |
| 2011/0069968 | A1* | 3/2011 | Tanaka | G02B 6/29362 398/140 |
| 2011/0251905 | A1* | 10/2011 | Lawrence | G03H 1/0005 705/15 |
| 2011/0310356 | A1* | 12/2011 | Vallius | G03B 33/06 353/31 |
| 2012/0113397 | A1* | 5/2012 | Hirao | G02B 26/0858 353/37 |
| 2012/0170003 | A1* | 7/2012 | Chiang | G03B 21/2013 353/31 |
| 2013/0258293 | A1* | 10/2013 | Peng | G02F 1/0102 353/31 |
| 2013/0286357 | A1* | 10/2013 | Kodama | H04N 9/3167 353/20 |
| 2014/0146092 | A1* | 5/2014 | Toyooka | H04N 9/3155 345/690 |
| 2014/0254016 | A1* | 9/2014 | Egawa | H04N 9/3161 359/513 |
| 2015/0062087 | A1* | 3/2015 | Cho | G02F 1/13338 345/175 |
| 2015/0124225 | A1* | 5/2015 | Akiyama | F21V 5/043 353/31 |
| 2015/0277056 | A1* | 10/2015 | Colbourne | G02B 6/356 385/17 |
| 2015/0355468 | A1* | 12/2015 | Osterhout | G06F 3/012 345/633 |
| 2015/0355474 | A1* | 12/2015 | Masson | G02B 26/001 349/8 |
| 2016/0139560 | A1* | 5/2016 | Gorny | H04N 9/3126 348/40 |

FOREIGN PATENT DOCUMENTS

| | | |
|---|---|---|
| JP | 2002-221710 A | 8/2002 |
| JP | 2007-513380 A | 5/2007 |
| JP | 2008-216578 A | 9/2008 |
| JP | 2008-216579 A | 9/2008 |
| JP | 2008-224760 A | 9/2008 |
| JP | 2011-508911 A | 3/2011 |
| JP | 2011-510357 A | 3/2011 |
| JP | 4653729 B2 | 3/2011 |
| JP | 2012-190053 A | 10/2012 |
| WO | 2008/108217 A1 | 9/2008 |
| WO | 2013/094011 A1 | 6/2013 |

OTHER PUBLICATIONS

Microsoft Corporation, "Kinect for Windows", Human Interface Guidelines v2.0, 2014.
Ryder Ziola et al., OASIS: Examining a Framework for Interacting with General-Purpose Object Recognition, Oct. 26, 2010.
N. Linder et al., "LuminAR: Portable Robotic Augmented Reality Interface Design and Prototype", UIST '10 Adjunct proceedings of the 23nd annual ACM symposium on User interface software and technology, pp. 395-396, Oct. 3-6, 2010.
E. Buckley, "Holographic Laser Projection Technology", SID'08, Technical Digest, 2008, Information Display Dec. 2008, pp. 22-25.
International Search Report for PCT Application No. PCT/JP2015/005763, dated Feb. 9, 2016.
English translation of Written opinion for PCT Application No. PCT/JP2015/005763.

* cited by examiner

PROJECTION APPARATUS AND INTERFACE APPARATUS

This application is a National Stage Entry of PCT/JP2015/005763 filed on Nov. 18, 2015, which claims priority from Japanese Patent Application 2014-255666 filed on Dec. 18, 2014, the contents of all of which are incorporated herein by reference, in their entirety.

TECHNICAL FIELD

The present invention relates to a projection apparatus and an interface apparatus. In particular, the present invention relates to a projection apparatus and an interface apparatus to which a phase-modulation-type modulation element is applied.

BACKGROUND ART

In recent years, an interface apparatus which is a combination of a projector and a camera has been developed. In the interface apparatus, the projector projects an image to a projection surface, such as a table or a wall, and the camera detects the position or movement of the hand or finger of an operator for the projected image. In this way, an interactive operation is achieved. NPL 1 discloses an interface apparatus which is called the Everywhere Displays Projector (hereinafter, referred to as an ED projector) using a projector and a camera. The ED projector disclosed in NPL 1 can project an appropriate image according to the state of a projection surface and detect the operation of the operator for the projected image.

A modulation method of a projector includes an intensity modulation method and a phase modulation method. A general interface system uses an intensity-modulation-type projector. In the intensity modulation type, the intensity of illumination light is changed for each pixel of a modulation element and pixels on a screen are in one-to-one correspondence with pixels on the modulation element. Therefore, even when black is displayed, light with certain intensity is output, which results in unnecessary power consumption. In addition, in the intensity modulation type, as the distance between the projector and the screen increases, projection light is enlarged at a certain magnification. In this case, the size of an image projected to the screen increases as the distance increases and projection light is darkened in inverse proportion to the square of the distance. Therefore, it is necessary to increase the size of the apparatus to increase the brightness of a light source of the project, in order to obtain a clear image in a dark place in which contrast is significantly low.

In contrast, in the phase modulation type, the pixels on the screen are not in one-to-one correspondence with the pixels on the modulation element and the pixels on the modulation element are associated with all of the pixels on the screen. In the phase modulation type, since light is focused on a necessary portion, no light is projected to a portion on the screen in which black is displayed and power is not unnecessarily consumed. Therefore, in the phase modulation type, power efficiency is higher than that in the intensity modulation type. In addition, the phase modulation type can be designed such that an image is not darkened even when the distance between the projector and the screen increases. In addition, in the phase modulation type, since the pixels on the screen are not in one-to-one correspondence with the pixels on the modulation element, a defective pixel of the modulation element does not become a defect on the screen.

When a phase-modulation-type projector is used to project an image with a substantially small projection area, such as a line image or characters, it is possible to achieve a wearable interface system with a small size and low power consumption. PTL 1 discloses a projection display device including a phase modulation means.

In an interface system that projects, for example, a line image or characters, it is preferable that classifications be displayed in different colors in order to easily distinguish projection images. Therefore, it is necessary to project multicolor light. As a system for displaying multiple colors using a projector, there is a three-chip system or a time division system. PTL 2 discloses a phase-modulation-type projector that displays multiple colors using the three-chip system. PTL 3 discloses a phase-modulation-type projector that displays multiple colors using a combination of a three-chip system and a time division system.

CITATION LIST

Patent Literature

[PTL 1] Japanese Patent Application Laid-Open No. 2012-190053
[PTL 2] International Publication No. 2008/108217
[PTL 3] Japanese Patent No. 4653729

Non Patent Literature

[NPL 1] C. Pinhanez, "Everywhere Displays Projector", [online], IBM, [searched on May 7, 2014], Internet (URL: http://www.research.ibm.com/people/p/pinhanez/publications/ubico mp01.pdf)

SUMMARY OF INVENTION

Technical Problem

The ED projector disclosed in NPL 1 can project an image corresponding to the state of a projection surface. However, it is necessary to reduce the overall size of the apparatus including the projector, in order to incorporate the apparatus into a wearable system.

In the phase-modulation-type modulation system disclosed in PTL 1, when an image with a small black portion, such as a natural image, is projected, most of the pixels are used for display and superiority in power efficiency is removed. In addition, in the apparatus disclosed in PTL 1, when the diameter of a laser beam is increased in order to increase the resolution of each color, color mixture occurs in adjacent display surfaces of different colors on the modulation element.

The three-chip system disclosed in PTL 2 and PTL 3 uses three modulation elements. Therefore, signal processing circuit systems and optical combination systems corresponding to the modulation elements are required, which results in an increase in the size or cost of the apparatus.

In the time division system disclosed in PTL 3, a modulation element that operates at a high speed is required. In the time division system, since the time for which each color glows is short, a light source that has high output capability and high power consumption is required. Therefore, in the time division system, the size, power consumption, and cost of the apparatus increase. In particular, a big challenge is to reduce the size, weight, power consumption, and cost of a mobile or wearable apparatus. In addition, in the time division system, the principle is that light beams of different colors are temporally emitted. As a result, the phenomenon of so-called color breakup becomes a visual problem. In particular, when the time-division-type projector is applied to a wearable apparatus, a projection image is moved with the movement of a person and color breakup is conspicuous. In addition, in the phase modulation type, the positions of each color on the screen are changed. Therefore, when time division is performed, the matching (referred to as convergence) between the positions of each color on the screen is required.

An object of the invention is to provide a projection apparatus and an interface apparatus that have a small size and low power consumption and can display multiple colors with high resolution, without color breakup.

Solution to Problem

A projection apparatus according to the invention includes: a light source that emits laser beams of a plurality of colors; a modulation means that has a phase-modulation-type modulation element including display regions corresponding to each color of the laser beams of the plurality of colors emitted from the light source and modulates incident laser beams; an unnecessary component removal means that removes the unnecessary components, which are generated by the modulation of laser beams of other colors mixed in the display regions corresponding to the laser beams of the plurality of colors, from the laser beams modulated by the modulation means using wavelength selection; and a projection means that projects light from which the unnecessary components have been removed by the unnecessary component removal means.

An interface apparatus comprising: a projection unit including a light source that emits laser beams of a plurality of colors, a modulation means that has a phase-modulation-type modulation element including display regions corresponding to each color of the laser beams of the plurality of colors emitted from the light source and modulates incident laser beams, an unnecessary component removal means that removes the unnecessary components, which are generated by the modulation of laser beams of other colors mixed in the display regions corresponding to the laser beams of the plurality of colors, from the laser beams modulated by the modulation means using wavelength selection; and a projection means that projects light from which the unnecessary components have been removed by the unnecessary component removal means; an imaging unit that captures a region including an image projected by the projection unit; and a control unit that provides image information corresponding to an operation performed for the image in the region captured by the imaging unit to the projection unit and controls the projection unit such that the image information is projected.

Advantageous Effects of Invention

According to the invention, it is possible to provide a projection apparatus and an interface apparatus that have a small size and low power consumption and can display multiple colors with high resolution, without color breakup.

DESCRIPTION OF EMBODIMENTS

Figure 1:
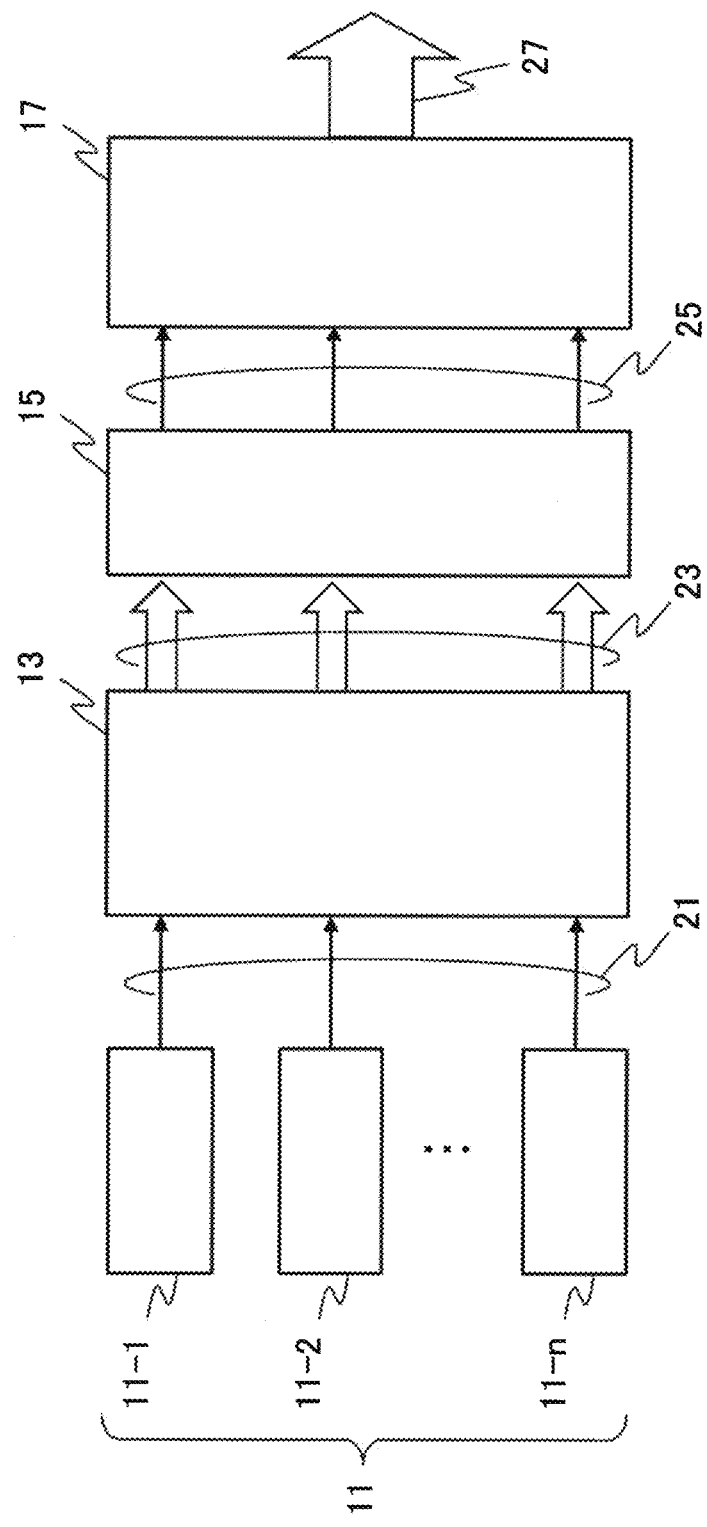
FIG. 1 is a block diagram illustrating the structure of a projection apparatus according to a first exemplary embodiment of the invention.

Hereinafter, exemplary embodiments of the invention will be described with reference to the drawings. The following exemplary embodiments are preferably limited in terms of technique in order to achieve the invention. However, the scope of the invention is not limited to the following. In all of the drawings used to illustrate the following exemplary embodiments, the same components are denoted by the same reference numerals and the description thereof will not be repeated, unless otherwise noted.

First Exemplary Embodiment

First, a projection apparatus according to a first exemplary embodiment of the invention will be described. FIG. 1 is a block diagram illustrating the structure of the projection apparatus according to this exemplary embodiment. The projection apparatus according to this exemplary embodiment includes a light source 11, a modulation means 13, an unnecessary component removal means 15, and a projection means 17. In FIG. 1, components are illustrated so as to be linearly arranged. However, in practice, the components are not linearly arranged and the distance between the components is not accurately illustrated.

The light source 11 includes a plurality of laser light sources 11-1 to 11-$n$ that emit laser beams with specific wavelengths (n is a natural number equal to or greater than 2). The light source 11 emits laser beams 21 with at least two or more wavelengths, that is, laser beams 21 of a plurality of colors. In addition, the plurality of colors may include light with wavelengths other than visible light. It is preferable that the laser light sources 11-1 to 11-$n$ emit laser beams of different colors. However, some of the plurality of laser light sources 11-1 to 11-$n$ may emit laser beams of the same color.

For example, the laser light sources 11-1 to 11-3 that emit laser beams of three primary colors, that is, red, green, and blue can be combined with each other to form the light source 11 that emits laser beams of three primary colors. In addition, for example, the light source 11 may be configured such that it emits laser beams of two of the three primary colors, that is, red, green, and blue. For example, at least one laser light source that emits infrared light or ultraviolet light in addition to laser beams of the three primary colors, that is, red, green, and blue may be added. For example, a laser light source that emits laser beams of colors other than the three primary colors may be used to form the light source 11.

The modulation means 13 includes a phase-modulation-type modulation element that modulates the laser beam 21 emitted from the light source 11 to generate a laser beam 23. The modulation means 13 has regions (hereinafter, referred to as display regions) corresponding to the colors of each incident laser beam and modules the phases of a plurality of laser beams emitted to each display region. That is, the modulation means 13 includes a phase-modulation-type modulation element including the display regions corresponding to the laser beams of each color emitted from the light source 11.

The phase-modulation-type modulation element includes a plurality of light receiving regions which are arranged in a lattice shape. The plurality of light receiving regions are allocated to each display region. A control means (not illustrated) controls parameters for determining the difference between the phase of the laser beam incident on each light receiving region and the phase of the laser beam emitted from each light receiving region, for example, optical characteristics including a refractive index and the length of an optical path such that the parameters are changed. For example, the control means controls a voltage applied to each light receiving region such that the refractive index of each light receiving region is changed and the refractive indexes of the light receiving regions are different from each other. The laser beam incident on each light receiving region is appropriately diffracted on the basis of the difference between the refractive indexes of the light receiving regions. As a result, the phase distribution of light incident on a display element is modulated according to the optical characteristics of each light receiving region.

The phase-modulation-type modulation element is achieved by, for example, ferroelectric liquid crystal, homogeneous liquid crystal, or vertically aligned liquid crystal. For example, the phase-modulation-type modulation element is achieved by liquid crystal on silicon (LCOS) or a micro electro-mechanical system (MEMS).

In this exemplary embodiment, the incident angle of the laser beam with respect to a display surface of the modulation means 13 is nonvertical. That is, the emission axis of the laser beam emitted from the light source 11 is inclined with respect to the display surface of the modulation means 13. Next, the reason why the emission axis of the laser beam is inclined with respect to the display surface of the modulation means 13 will be described.

In a general intensity-modulation-type projector, light is vertically incident on an intensity-modulation-type modulation element (LCOS) by a polarizing beam splitter. In the modulation of light by the intensity-modulation-type modulation element using a twisted nematic liquid crystal (also referred to as a TN liquid crystal), the polarization direction of incident light is bent. The intensity-modulation-type modulation element can form light that passes through the polarizing beam splitter according to the degree of modulation and can modulate light intensity.

However, the phase-modulation-type modulation element (LCOS) only modulates the phase of a wave front with a change in refractive index and does not modulate polarized light. Therefore, light that is vertically incident on the phase-modulation-type modulation element by the polarizing beam splitter is modulated by the modulation element and returns in a direction opposite to the incident direction. Therefore, light cannot be vertically incident on the phase-modulation-type modulation element by the polarizing beam splitter. However, when a beam splitter without polarization is used, light that is vertically incident on the phase-modulation-type modulation element is modulated and emitted.

However, efficiency is reduced to one fourth. The reason is as follows. Light incident on the beam splitter is divided in two directions while passing through the beam splitter and the intensity of light incident on the modulation element is reduced by half. Light that has been modulated by the modulation element is divided in two directions while passing through the beam splitter and the intensity of the light is further reduced by half.

For this reason, in the projection apparatus according to this exemplary embodiment, the emission axis of a laser beam with respect to the modulation means 13 is obliquely set and light can be incident on the modulation means 13, without using a beam splitter. Therefore, efficiency is improved.

When the laser beam 21 is incident on the modulation means 13, the modulation means 13 modulates the incident laser beam 21 and emits the laser beam 23. The laser beam 23 includes a necessary component that has been modulated in a display region in which the component is originally to be modulated and an unnecessary component (hereinafter, referred to as an unnecessary component) that has been modulated in a display region other than the display region in which the component is originally to be modulated, which will be described below.

Figure 2:
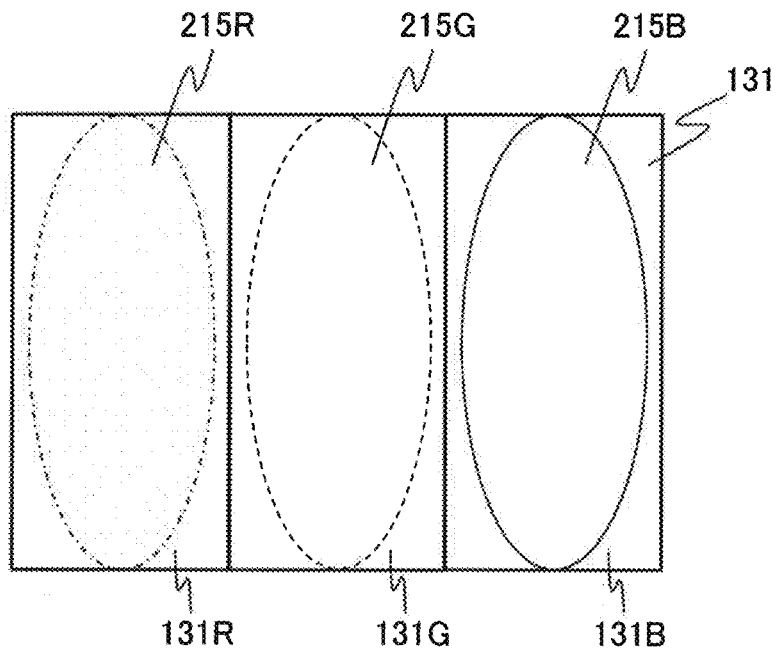
FIG. 2 is a conceptual diagram illustrating an example of a beam pattern emitted to each display region on a display surface of a modulation element included in the projection apparatus according to the first exemplary embodiment of the invention.
Figure 3:
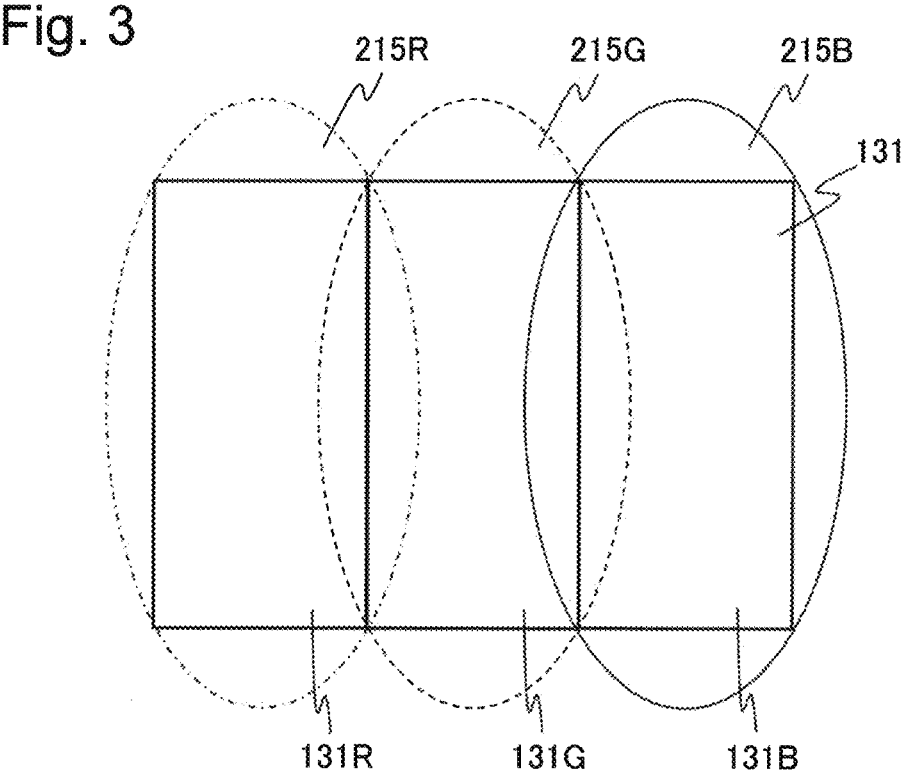
FIG. 3 is a conceptual diagram illustrating an example of the beam pattern emitted to each display region on the display surface of the modulation element included in the projection apparatus according to the first exemplary embodiment of the invention.

Here, restrictions on the phase-modulation-type modulation element will be described with reference to FIGS. 2 and 3. The restrictions on the phase modulation type described in this exemplary embodiment are not applied to the intensity modulation type. In FIGS. 2 and 3, an example in which three colors, that is, red (R), green (G), and blue (B) are used will be described. However, in practice, arbitrary colors may be combined with each other.

FIGS. 2 and 3 illustrate an example of a display surface 131 of a modulation element 130 when three colors, that is, red, green, and blue are used. The display surface 131 includes display regions 131R, 131G, and 131B which correspond to red, green, and blue, respectively. The display regions 131R, 131G, and 131B are regions for displaying red, green, and blue, respectively. Beam patterns 215R (one-dot chain line), 215G (dashed line), and 215B (solid line) indicate the irradiation ranges of red, green, and blue laser beams.

In the intensity modulation type, a beam pattern can be formed in the shape of an irradiation surface (for example, a rectangular shape) by, for example, a beam homogenizer in order to uniformly emit the laser beams to each irradiation surface. However, in the phase modulation type, when the beam homogenizer for shaping the beam pattern is used, the wave front of the laser beam is broken and the original performance is not obtained. Therefore, in the phase modulation type, only an optical system, such as a collimator, that does not break the wave front of a laser beam can be provided and the beam pattern has the original shape that results from a laser beam, such as a circular shape or an elliptical shape.

FIG. 2 illustrates an example in which laser beams are emitted such that the beam patterns 215R, 215G, and 215B are fitted to the display regions 131R, 131G, and 131B, respectively. In the example illustrated in FIG. 2, since the laser beam is not incident on four corners of each of the display regions 131R, 131G, and 131B, resolution is lower than that when the laser beam is incident on the entire display region. When the irradiation area of each laser beam is increased as illustrated in FIG. 3 in order to prevent the reduction in resolution, the region of each laser beam is expanded to the regions of other colors and the colors are mixed with each other. Therefore, a method that prevents the mixture of colors while maintaining high resolution is required.

In this exemplary embodiment, wavelength selectivity is obtained by an optical system in which a dichroic mirror that selectively transmits laser beams of some colors among the laser beams of a plurality of colors included in the laser beams modulated by the modulation element is combined with a mirror that reflects the laser beams of a plurality of colors. The optical system guides an unnecessary component included in the laser beam modulated by the modulation element in a direction different from a projection direction such that the unnecessary component is absorbed by a light absorber and is removed and guides a necessary component to be projected as projection light in the projection direction. The dichroic mirror may selectively reflect laser beams of some colors among the laser beams of a plurality of colors included in the laser beams modulated by the modulation element.

The unnecessary component removal means 15 is an optical system that removes the unnecessary components from the laser beam 23 generated by the modulation of the laser beam 21 by the modulation means 13 and generates a laser beam 25. The unnecessary components removed by the unnecessary component removal means 15 are, for example, components generated by the modulation of the beam pattern 215G that protrudes to the display regions 131R and 131B or the beam patterns 215R and 215B that protrude to the display region 131G in the display surface 131 illustrated in FIG. 3.

That is, the unnecessary component removal means 15 removes the unnecessary components, which is generated by the modulation of laser beams of different colors which are mixed in the display regions corresponding to the laser beams of a plurality of colors, from the laser beam 23 modulated by the modulation means 13 using wavelength selection The projection means 17 is an optical system that performs Fourier transform for the laser beam 25 generated by the unnecessary component removal means 15 and projects the Fourier-transformed beam as projection light 27. The projection means 17 includes a Fourier transform lens that performs Fourier transform for the laser beam 25 and a projection lens that projects the projection light 27. Hereinafter, an optical element, such as the Fourier transform lens or the projection lens, is illustrated as one element. However, in practice, the optical element is a combination of a plurality of elements. Therefore, for example, a Fourier transform means (Fourier transform lens) that performs Fourier transform for the laser beam 25 and a projection means (projection lens) that projects the projection light 27 may be regarded as different components.

That is, the projection means 17 includes the Fourier transform lens that performs Fourier transform for the laser beam from which unnecessary components have been removed by the unnecessary component removal means 15 and the projection lens that projects the Fourier-transformed beam. An image Fourier-transformed by the Fourier transform lens is a kind of image that is formed by an aggregate of diffraction gratings. The image is formed by the convergence of light diffracted by the diffraction gratings.

In the projection apparatus according to this exemplary embodiment, it is assumed that a projection image inverse-Fourier-transformed by the modulation means 13 is displayed. However, when it is not necessary to perform Fourier transform for the image displayed on the modulation means 13, the projection means 17 may not include the Fourier transform lens. When the Fourier transform lens is not included in the projection means 17, an optical lens, such as a convex lens, may be provided instead of the Fourier transform lens or light emitted from the modulation means 13 may be incident on the projection lens without any change.

A color display method in the projection apparatus is mainly classified into two methods. One of the methods is a three-chip method using a liquid crystal light bulb. In the three-chip method, modulation elements corresponding to three primary colors, that is, red, green, and blue are provided and light beams modulated by the modulation elements are combined and projected. The other method is a time division method using a digital micromirror device (DMD) or a LCOS. The time division method rapidly switches images corresponding to red, green, and blue, using one modulation element, changes the color of illumination light in synchronization with the switched image, and displays the image. In any type of projector, the intensity-modulation-type modulation element is generally used.

In the phase modulation method according to this exemplary embodiment, laser beams are incident on different display regions on one modulation element and are modulated. Therefore, the size of the apparatus can be smaller than that in the three-chip type. A plurality of laser light sources used in this exemplary embodiment can be configured so as to regularly emit laser beams. Therefore, an instantaneously high output is not required unlike the time division driving type. In addition, in the phase modulation method according to this exemplary embodiment, light is not uniformly projected to a region in a projection range, but is projected so as to be partially concentrated. In this way, an image, such as a character, a symbol, or a frame border, is projected. Therefore, it is possible to suppress the overall laser output. As a result, the projection apparatus according to this exemplary embodiment can include small and low-power laser light sources and a power supply that has low power consumption and drives the laser light sources and it is possible to reduce the size and cost of the apparatus.

Figure 4:
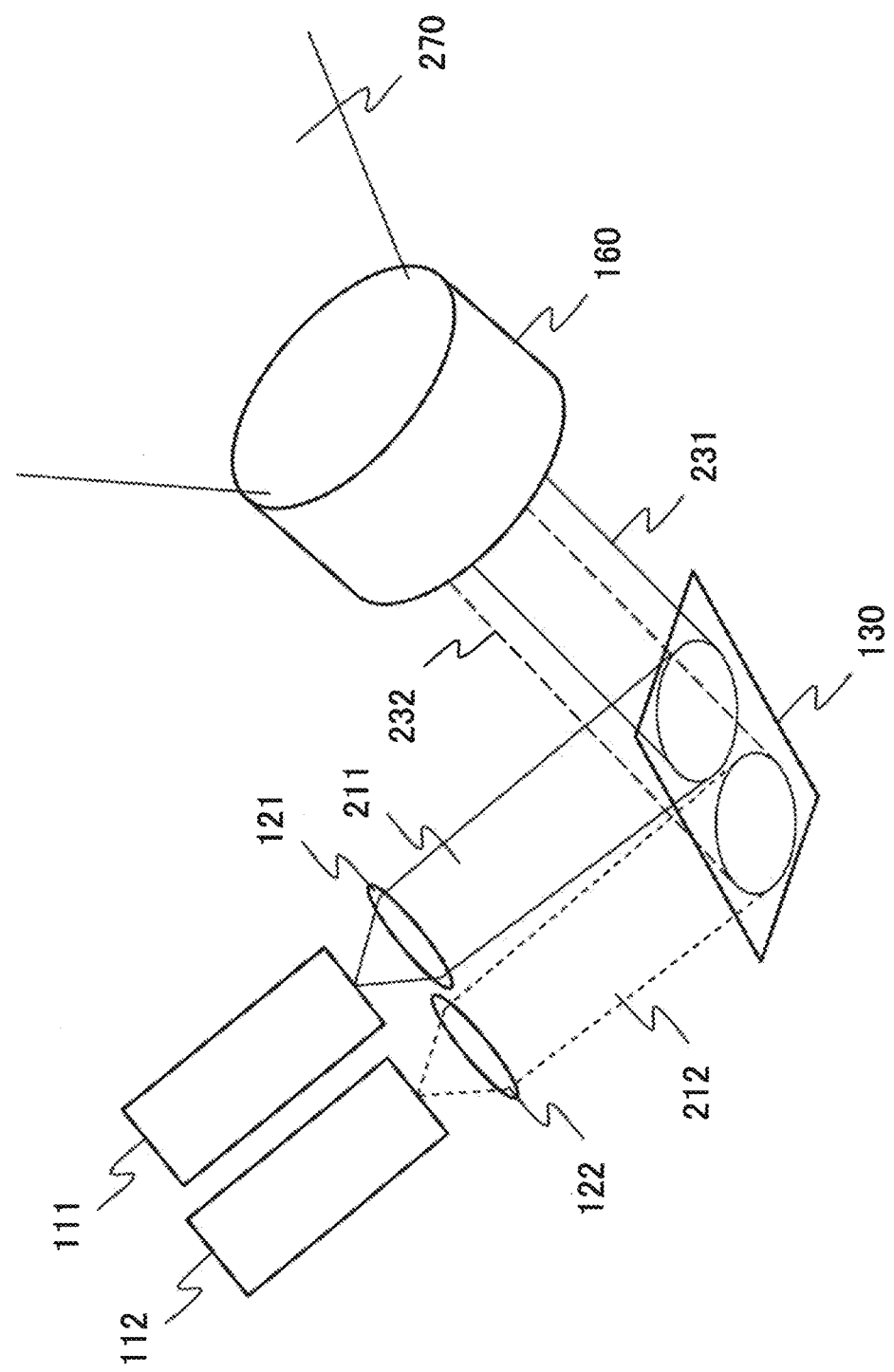
FIG. 4 is a conceptual diagram illustrating an example of the structure of the projection apparatus according to the first exemplary embodiment of the invention.

FIG. 4 illustrates an example in which the projection apparatus according to this exemplary embodiment includes laser light sources of two colors.

The projection apparatus illustrated in FIG. 4 includes a first laser light source 111, a second laser light source 112, a first collimator lens 121, a second collimator lens 122, a phase-modulation-type modulation element 130, and a combination optical system 160.

The first and second laser light sources 111 and 112 and the first and second collimator lenses 121 and 122 are included in the light source 11 illustrated in FIG. 1. The phase-modulation-type modulation element 130 has the functions of the modulation means 13 illustrated in FIG. 1. The combination optical system 160 has the functions of the unnecessary component removal means 15 and the projection means 17 illustrated in FIG. 1.

Laser beams 211 (solid line) and 212 (dashed line) are collimated by the first and second collimator lenses 121 and 122, respectively. The laser beams 211 (solid line) and 212 (dashed line) are obliquely incident on a display surface of the modulation element 130. The modulation element 130 modulates the phases of the laser beams 211 (solid line) and 212 (dashed line) to generate laser beams 231 (solid line) and 232 (dashed line), respectively. The laser beams 231 and 232 include unnecessary components. Projection light 270 is projected by the combination optical system 160. In the example illustrated in FIG. 4, since unnecessary components are removed in the combination optical system 160, the projection light does not include any unnecessary component.

According to the example illustrated in FIG. 4, since the laser beams are obliquely incident on the display surface of the modulation element 130, it is possible to illuminate the modulation element without passing through a complicated optical system. In the case of the phase modulation type, it is important to prevent the wave front of light from being broken. Therefore, the optical system illustrated in FIG. 4 is preferable.

Unnecessary Component Removal Means

Here, the detailed structure of the unnecessary component removal means 15 according to this exemplary embodiment will be described. The structure of the unnecessary component removal means 15 varies depending on the number of colors of the laser light source. Therefore, an example of the number of colors of the laser light source will be described.

Two-Color Laser Light Source

First, an example in which a two-color laser light source is used will be described.

Figure 5:
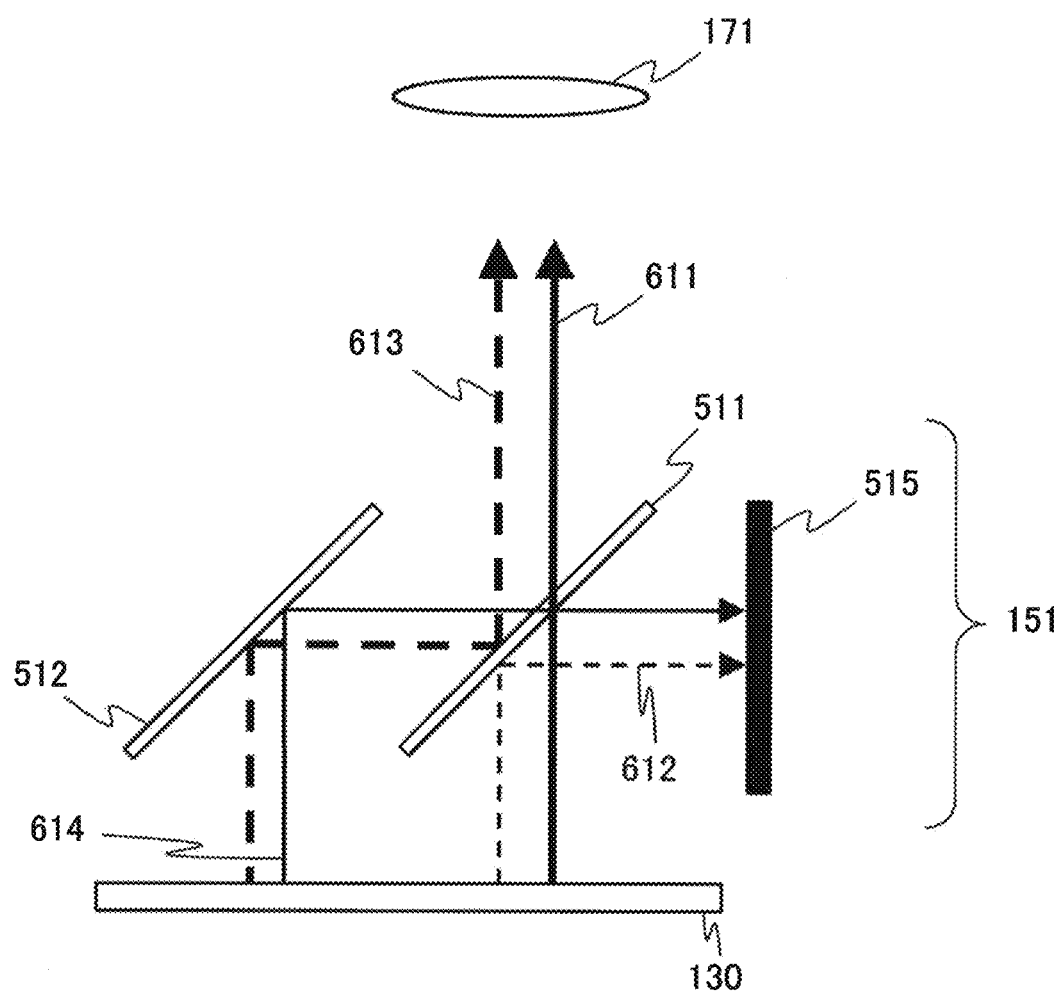
FIG. 5 is a conceptual diagram illustrating an example of an unnecessary component removal means in the projection apparatus according to the first exemplary embodiment of the invention.

FIG. 5 illustrates an example (unnecessary component removal means 151) of the structure of the unnecessary component removal means 15 in the projection apparatus according to this exemplary embodiment. In the example illustrated in FIG. 5, unnecessary components are removed from laser beams of two colors which are emitted from the first and second laser light sources (not illustrated). The unnecessary component removal means 151 illustrated in FIG. 5 is arranged between the phase-modulation-type modulation element 130 and a Fourier transform lens 171.

As illustrated in FIG. 5, the unnecessary component removal means 151 includes a dichroic mirror 511, a mirror 512, and a light absorber 515. The modulation element 130 illustrated in FIG. 5 includes a first display region that modulates the laser beams emitted from the first laser light source and a second display region that modulates the laser beams emitted from the second laser light source.

The dichroic mirror 511 selectively transmits the laser beams emitted from the first laser light source. For example, when the first laser light source emits blue light and the second laser light source emits red light, the dichroic mirror 511 transmits the blue light and reflects the red light. The mirror 512 reflects all of the laser beams. The light absorber 515 absorbs all of the laser beams.

In FIG. 5, laser beams 611 (thick solid line) and 613 (thick dashed line) are necessary components which are converted into projection light. In contrast, laser beams 612 (thin dashed line) and 614 (thin solid line) are unnecessary components.

A laser beam (first laser beam) emitted from the first laser light source is modulated by the first display region and is emitted as the laser beam 611. A laser beam (second laser beam) emitted from the second laser light source is modulated by the first display region and is emitted as the laser beam 612. The laser beam (second laser beam) emitted from the second laser light source is modulated by the second display region and is emitted as the laser beam 613. The laser beam (first laser beam) emitted from the first laser light source is modulated by the second display region and is emitted as the laser beam 614.

The mirror 512 is arranged such that the laser beams 613 and 614 are incident on a reflection surface of the dichroic mirror 511. The dichroic mirror 511 is arranged such that the laser beams 611 and 613 are incident on the Fourier transform lens 171 along the optical axis of emission light. The light absorber 515 is arranged such that the laser beams 612 and 614 are incident thereon.

The mirror 512 reflects the laser beams 613 and 614 to the dichroic mirror 511. The dichroic mirror 511 reflects the laser beam 613 of two components reflected by the mirror 512 to the Fourier transform lens 171 and transmits the laser beam 614. In addition, the dichroic mirror 511 transmits the laser beam 611 and reflects the laser beam 612 to the light absorber 515. The light absorber 515 absorbs the laser beams 612 and 614.

According to the structure illustrated in FIG. 5, the laser beam 612 is reflected by the dichroic mirror 511 and is guided to the light absorber 515. The laser beam 614 is reflected by the mirror 512, passes through the dichroic mirror 511, and is guided to the light absorber 515. That is, both the laser beams 612 and 614, which are unnecessary components, are absorbed by the light absorber 515, without traveling in the projection direction of the projection light.

In contrast, the laser beams 611 and 613 from which unnecessary components have been removed are guided to the Fourier transform lens 171.

Therefore, according to the structure illustrated in FIG. 5, since unnecessary components which protrude to adjacent display region are removed, color mixture does not occur and it is possible to ensure the maximum resolution.

The example illustrated in FIG. 5 can be expressed as follows. The display surface of the modulation element 130 includes the first display region for modulating the first laser beam emitted from the first laser light source and the second display region for modulating the second laser beam emitted from the second laser light source. The unnecessary component removal means 151 includes the light absorber 515 that absorbs unnecessary components, the dichroic mirror 511, and the mirror 512. The mirror 512 reflects the first laser beam (laser beam 614) and the second laser beam (laser beam 613) modulated by the second display region to the dichroic mirror 511. The dichroic mirror 511 reflects the second laser beam (laser beam 613) reflected by the mirror 512 to the Fourier transform lens 171 and transmits the first laser beam (laser beam 614) reflected by the mirror 512 to the light absorber 515. At the same time, the dichroic mirror 511 transmits the first laser beam (laser beam 611) modulated by the first display region to the Fourier transform lens 171 and reflects the second laser beam (laser beam 612) modulated by the first display region to the light absorber 515. The expression used here can also be applied to laser beams of three or more colors.

Three-Color Laser Light Source

Next, an example in which a three-color laser light source is used will be described.

Figure 6:
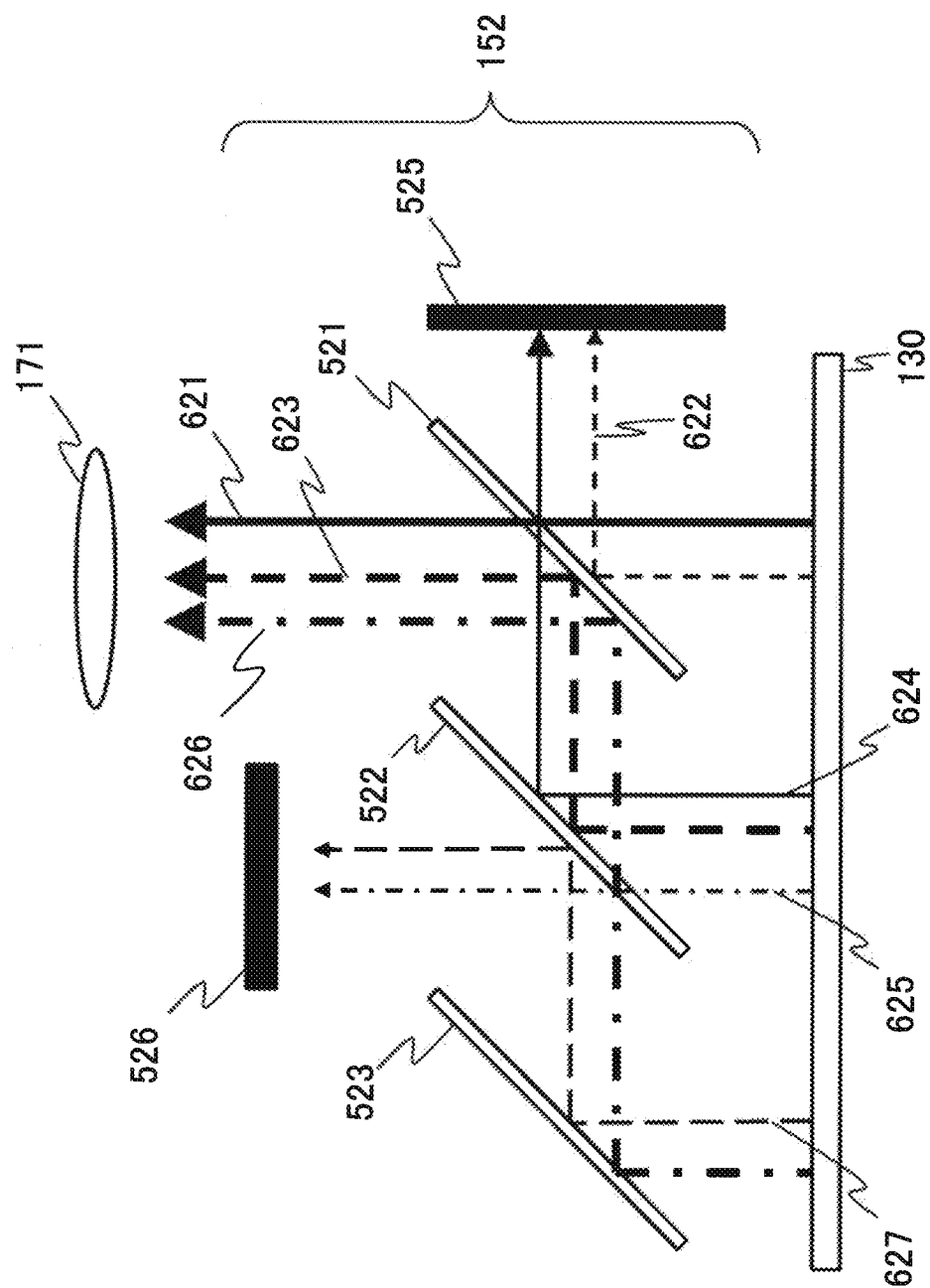
FIG. 6 is a conceptual diagram illustrating an example of the unnecessary component removal means in the projection apparatus according to the first exemplary embodiment of the invention.

FIG. 6 illustrates an example (unnecessary component removal means 152) of the structure of the unnecessary component removal means 15 in the projection apparatus according to this exemplary embodiment. In the example illustrated in FIG. 6, unnecessary components are removed from laser beams of three colors emitted from first, second, and third laser light sources (not illustrated). The unnecessary component removal means 152 illustrated in FIG. 6 is arranged between the phase-modulation-type modulation element 130 and the Fourier transform lens 171.

As illustrated in FIG. 6, the unnecessary component removal means 152 includes a first dichroic mirror 521, a second dichroic mirror 522, a mirror 523, a first light absorber 525, and a second light absorber 526. The modulation element 130 illustrated in FIG. 6 includes a third display region that modulates the laser beam emitted from the third laser light source, in addition to the first and second display regions. However, it is assumed that the first and second display regions are adjacent to each other, the second and third display regions are adjacent to each other, and the first and third display regions are not adjacent to each other.

The first dichroic mirror 521 selectively transmits the laser beam emitted from the first laser light source. The second dichroic mirror 522 selectively transmits the laser beam emitted from the third laser light source. For example, when the first laser light source emits a blue laser beam, the second laser light source emits a green laser beam, and the third laser light source emits a red laser beam, the first dichroic mirror 521 transmits the blue laser beam and reflects the red and green laser beams. In this case, the second dichroic mirror 522 transmits the red laser beam and reflects the blue and green laser beams. The mirror 523 reflects all of the laser beams. The first light absorber 525 and the second light absorber 526 absorb all of the laser beams.

In FIG. 6, laser beams 621 (thick solid line), 623 (thick dashed line), and 626 (thick one-dot chain line) are necessary components which are converted into projection light. In contrast, laser beams 622 (thin dashed line), 624 (thin solid line), 625 (thin one-dot chain line), and 627 (thin long dashed line) are unnecessary components.

A laser beam emitted from the first laser light source is modulated by the first display region and is emitted as the laser beam 621. A laser beam emitted from the second laser light source is modulated by the first display region and is emitted as the laser beam 622.

A laser beam emitted from the second laser light source is modulated by the second display region and is emitted as the laser beam 623. A laser beam emitted from the first laser light source is modulated by the second display region and is emitted as the laser beam 624. A laser beam emitted from the third laser light source is modulated by the second display region and is emitted as the laser beam 625.

A laser beam emitted from the third laser light source is modulated by the third display region and is emitted as the laser beam 626. A laser beam emitted from the second laser light source is modulated by the third display region and is emitted as the laser beam 627.

The mirror 523 is arranged such that the laser beams 626 and 627 are incident on a reflection surface of the second dichroic mirror 522. The second dichroic mirror 522 is arranged such that the laser beams 623, 624, and 626 are incident on a reflection surface of the first dichroic mirror 521. In addition, the first dichroic mirror 521 is arranged such that the laser beams 621, 623, and 626 are incident on the Fourier transform lens 171 along the optical axis of emission light. The first light absorber 525 is arranged such that the laser beams 622 and 624 are incident thereon. The second light absorber 526 is arranged such that the laser beams 625 and 627 are incident thereon.

The mirror 523 reflects the laser beams 626 and 627 to the second dichroic mirror 522. The second dichroic mirror 522 transmits the laser beam 625 and reflects the laser beams 623 and 624 to the first dichroic mirror 521. In addition, of two components reflected by the mirror 523, the second dichroic mirror 522 reflects the laser beam 627 to the second light absorber 526 and transmits the laser beam 626. The first dichroic mirror 521 transmits the laser beam 621 and reflects the laser beam 622 to the first light absorber 525. In addition, the first dichroic mirror 521 reflects the laser beam 626 transmitted through the second dichroic mirror 522 to the Fourier transform lens 171. Furthermore, of the components reflected by the second dichroic mirror 522, the first dichroic mirror 521 reflects the laser beam 623 to the Fourier transform lens 171 and transmits the laser beam 624. The first light absorber 525 absorbs the laser beams 622 and 624. The second light absorber 526 absorbs the laser beams 625 and 627.

According to the structure illustrated in FIG. 6, the laser beams 622 and 624 are guided to the first light absorber 525. The laser beams 625 and 627 are guided to the second light absorber 526. That is, all of the laser beams 622, 624, 625, and 627, which are unnecessary components, are absorbed by the first light absorber 525 or the second light absorber 526, without traveling in the projection direction of the projection light.

In contrast, the laser beams 621, 623, and 626 from which unnecessary components have been removed are guided to the Fourier transform lens 171, are Fourier-transformed, and become projection light.

Therefore, according to the structure illustrated in FIG. 6, similarly to the case of two colors, since unnecessary components that protrude to adjacent display regions are removed, color mixture does not occur and it is possible to ensure the maximum resolution.

Figure 7:
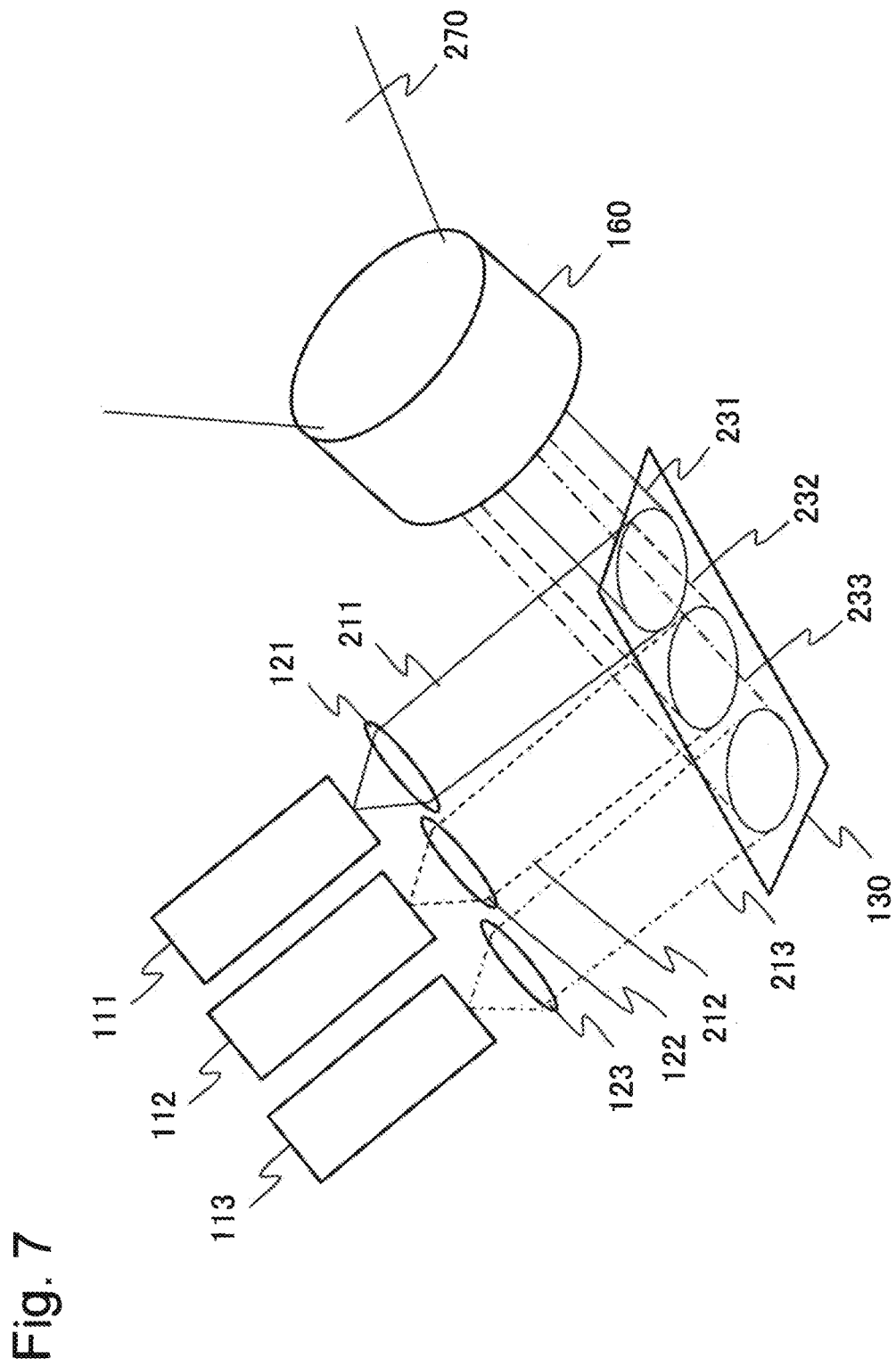
FIG. 7 is a conceptual diagram illustrating another example of the structure of the projection apparatus according to the first exemplary embodiment of the invention.

Here, FIG. 7 illustrates an example in which the projection apparatus according to this exemplary embodiment includes a three-color laser light source.

The structure illustrated in FIG. 7 differs from the structure illustrated in FIG. 4 in that a third laser light source 113 and a third collimator lens 123 are added. According to the example of the structure illustrated in FIG. 7, it is possible to respond to three colors.

A laser beam 213 (one-dot chain line) is collimated by the third collimator lens 123. The laser beam 213 is obliquely incident on the display surface of the modulation element 130. The modulation element 130 modulates the phase of the laser beam 213 (one-dot chain line) to generate a laser beam 233 (one-dot chain line). The laser beam 233 includes an unnecessary component.

According to the structure illustrated in FIG. 7, in the case of three colors, it is possible to obtain the same effect as that in the case of two colors illustrated in FIG. 4. In addition, in the case of four or more colors, laser light sources or collimator lenses may be added, similarly to FIG. 4 or FIG. 7. In this case, it is possible to obtain the same effect as that in the case of two colors or three colors.

Four-Color Laser Light Source

Next, an example in which a four-color laser light source is used will be described.

Figure 8:
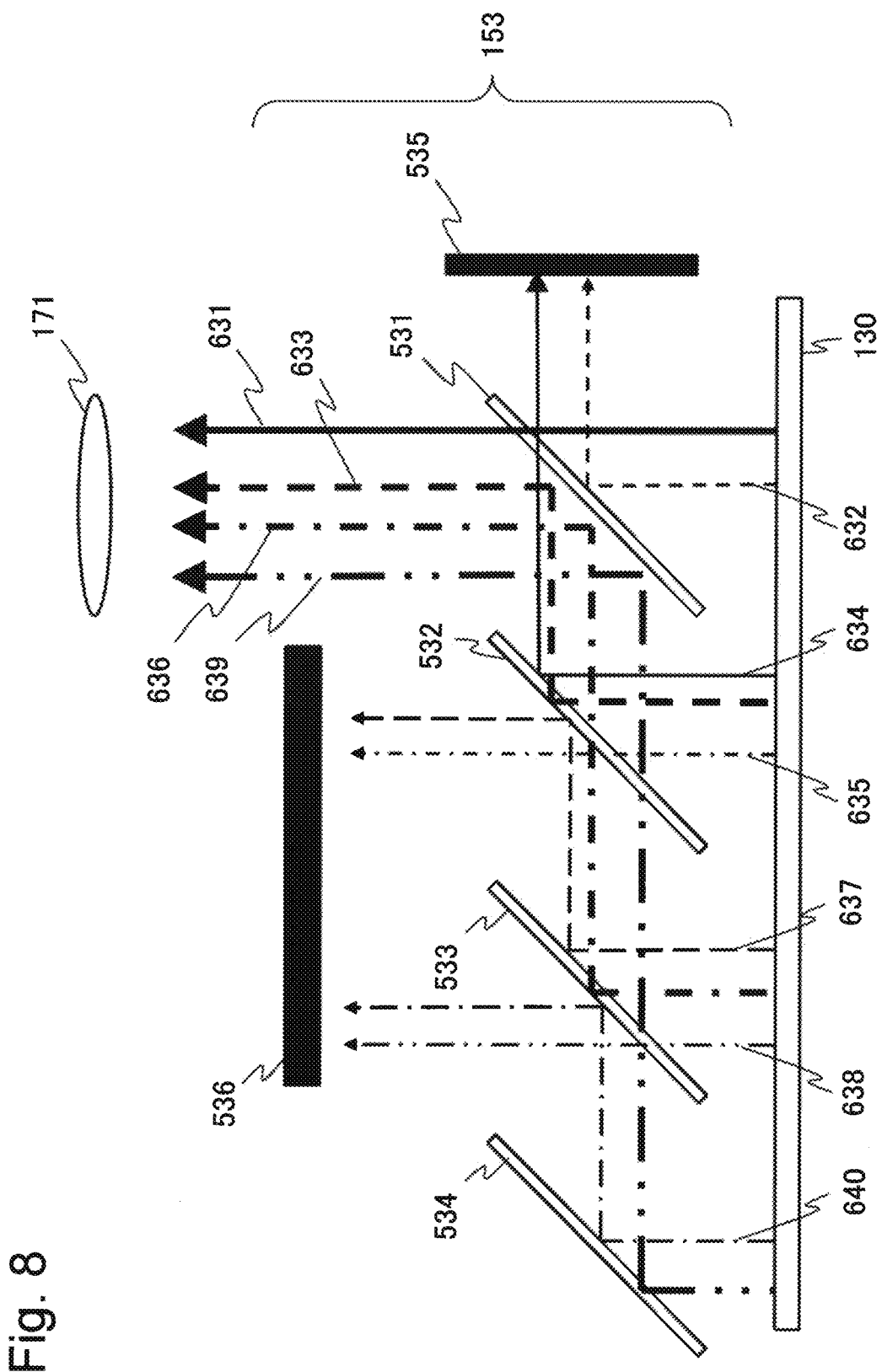
FIG. 8 is a conceptual diagram illustrating an example of the unnecessary component removal means in the projection apparatus according to the first exemplary embodiment of the invention.

FIG. 8 illustrates an example (unnecessary component removal means 153) of the structure of the unnecessary component removal means 15 in the projection apparatus according to this exemplary embodiment. In the example illustrated in FIG. 8, unnecessary components are removed from laser beams of four colors emitted from first, second, third and fourth laser light sources (not illustrated). The unnecessary component removal means 153 illustrated in FIG. 8 is arranged between the phase-modulation-type modulation element 130 and the Fourier transform lens 171.

Colors in a visible region can be represented by three primary colors, that is, red, green, and blue. In some cases, infrared light is used to detect the movement of an object. FIG. 8 illustrates an example in which laser beams of four colors including three primary colors are projected. A laser beam of the fourth color may be invisible light other than infrared light or may be visible light other than red, green, and blue.

As illustrated in FIG. 8, the unnecessary component removal means 153 includes a first dichroic mirror 531, a second dichroic mirror 532, a third dichroic mirror 533, a mirror 534, a first light absorber 535, and a second light absorber 536. The modulation element 130 illustrated in FIG. 8 includes a fourth display region that modulates the laser beam emitted from the fourth laser light source, in addition to the first, second, and third display regions. However, the first and second display regions are adjacent to each other, the second and third display regions are adjacent to each other, and the third and fourth display regions are adjacent to each other. In addition, the first display region is not adjacent to the third and fourth display region, the second display region is not adjacent to the fourth display region, the third display region is not adjacent to the first display region, and the fourth display region is not adjacent to the first and second display regions.

The first dichroic mirror 531 selectively transmits the laser beam emitted from the first laser light source. The second dichroic mirror 532 selectively transmits the laser beam emitted from the third laser light source. The third dichroic mirror 533 selectively transmits the laser beam emitted from the fourth laser light source. For example, when the first laser light source emits a blue laser beam, the second laser light source emits a green laser beam, the third laser light source emits a red laser beam, and the fourth laser light source emits an infrared laser beam, the first dichroic mirror 531 transmits the blue laser beam and reflects the infrared laser beam, the red laser beam, and the green laser beam. In this case, the second dichroic mirror 532 transmits the infrared laser beam and the red laser beam and reflects the blue laser beam and the green laser beam. The third dichroic mirror 533 transmits the infrared laser beam and reflects the red laser beam and the green laser beam. The mirror 534 reflects all of the laser beams. The first light absorber 535 and the second light absorber 536 absorb all of the laser beams.

In FIG. 8, laser beams 631 (thick solid line), 633 (thick dashed line), 636 (thick one-dot chain line), and 639 (thick two-dot chain line) are necessary components which are converted into projection light. In contrast, laser beams 632 (thin dashed line), 634 (thin solid line), 635 (thin one-dot chain line), 637 (thin long dashed line), 638 (thin two-dot chain line), and 640 (thin long one-dot chain line) are unnecessary components.

A laser beam emitted from the first laser light source is modulated by the first display region and is emitted as the laser beam 631. A laser beam emitted from the second laser light source is modulated by the first display region and is emitted as the laser beam 632.

A laser beam emitted from the second laser light source is modulated by the second display region and is emitted as the laser beam 633. A laser beam emitted from the first laser light source is modulated by the second display region and is emitted as the laser beam 634. A laser beam emitted from the third laser light source is modulated by the second display region and is emitted as the laser beam 635.

A laser beam emitted from the third laser light source is modulated by the third display region and is emitted as the laser beam 636. A laser beam emitted from the second laser light source is modulated by the third display region and is emitted as the laser beam 637. A laser beam emitted from the fourth laser light source is modulated by the third display region and is emitted as the laser beam 638.

A laser beam emitted from the fourth laser light source is modulated by the fourth display region and is emitted as the laser beam 639. A laser beam emitted from the third laser light source is modulated by the fourth display region and is emitted as the laser beam 640.

The mirror 534 is arranged such that the laser beams 639 and 640 are incident on a reflection surface of the third dichroic mirror 533. The third dichroic mirror 533 is arranged such that the laser beams 636, 637, and 639 are incident on a reflection surface of the second dichroic mirror 532. The second dichroic mirror 532 is arranged such that the laser beams 633, 636, and 639 are incident on a reflection surface of the first dichroic mirror 531. The first dichroic mirror 531 is arranged such that the laser beams 631, 633, 636, and 639 are incident on the Fourier transform lens 171 along the optical axis of emission light. The first light absorber 535 is arranged such that the laser beams 632 and 634 are incident thereon. The second light absorber 536 is arranged such that the laser beams 635, 637, 638, and 640 are incident thereon.

The mirror 534 reflects the laser beams 639 and 640 to the third dichroic mirror 533. The third dichroic mirror 533 reflects the laser beam 640 of two components reflected by the mirror 534 to the second light absorber 536 and transmits the laser beam 639. In addition, the third dichroic mirror 533 transmits the laser beam 638 and reflects the laser beams 636 and 637 to the second dichroic mirror 532. The second dichroic mirror 532 transmits the laser beam 639 transmitted through the third dichroic mirror 533. Of the components reflected by the third dichroic mirror 533, the second dichroic mirror 532 reflects the laser beam 637 to the second light absorber 536 and transmits the laser beam 636. In addition, the second dichroic mirror 532 transmits the laser beam 635 and reflects the laser beams 633 and 634 to the first dichroic mirror 531. The first dichroic mirror 531 reflects the laser beams 636 and 639 transmitted through the second dichroic mirror 532 to the Fourier transform lens 171. Of the components reflected by the second dichroic mirror 532, the first dichroic mirror 531 reflects the laser beam 633 to the Fourier transform lens 171 and transmits the laser beam 634. In addition, the first dichroic mirror 531 transmits the laser beam 631 and reflects the laser beam 632 to the first light absorber 535. The first light absorber 535 absorbs the laser beams 632 and 634. The second light absorber 536 absorbs the laser beams 635, 637, 638, and 640.

According to the structure illustrated in FIG. 8, the laser beams 632 and 634 are guided to the first light absorber 535. The laser beams 635, 637, 638, and 640 are guided to the second light absorber 536. That is, all of the laser beams 632, 634, 635, 637, 638, and 640, which are unnecessary components, are absorbed by the first light absorber 535 or 536, without traveling in the projection direction of the projection light.

In contrast, the laser beams 631, 633, 636, and 639 from which unnecessary components have been removed are guided to the Fourier transform lens 171, are Fourier-transformed, and become projection light.

Therefore, according to the structure illustrated in FIG. 5, similarly to the case of two colors or three colors, since unnecessary components that protrude to adjacent display regions are removed, color mixture does not occur and it is possible to ensure the maximum resolution.

Removal of High-Order Component

Figure 9:
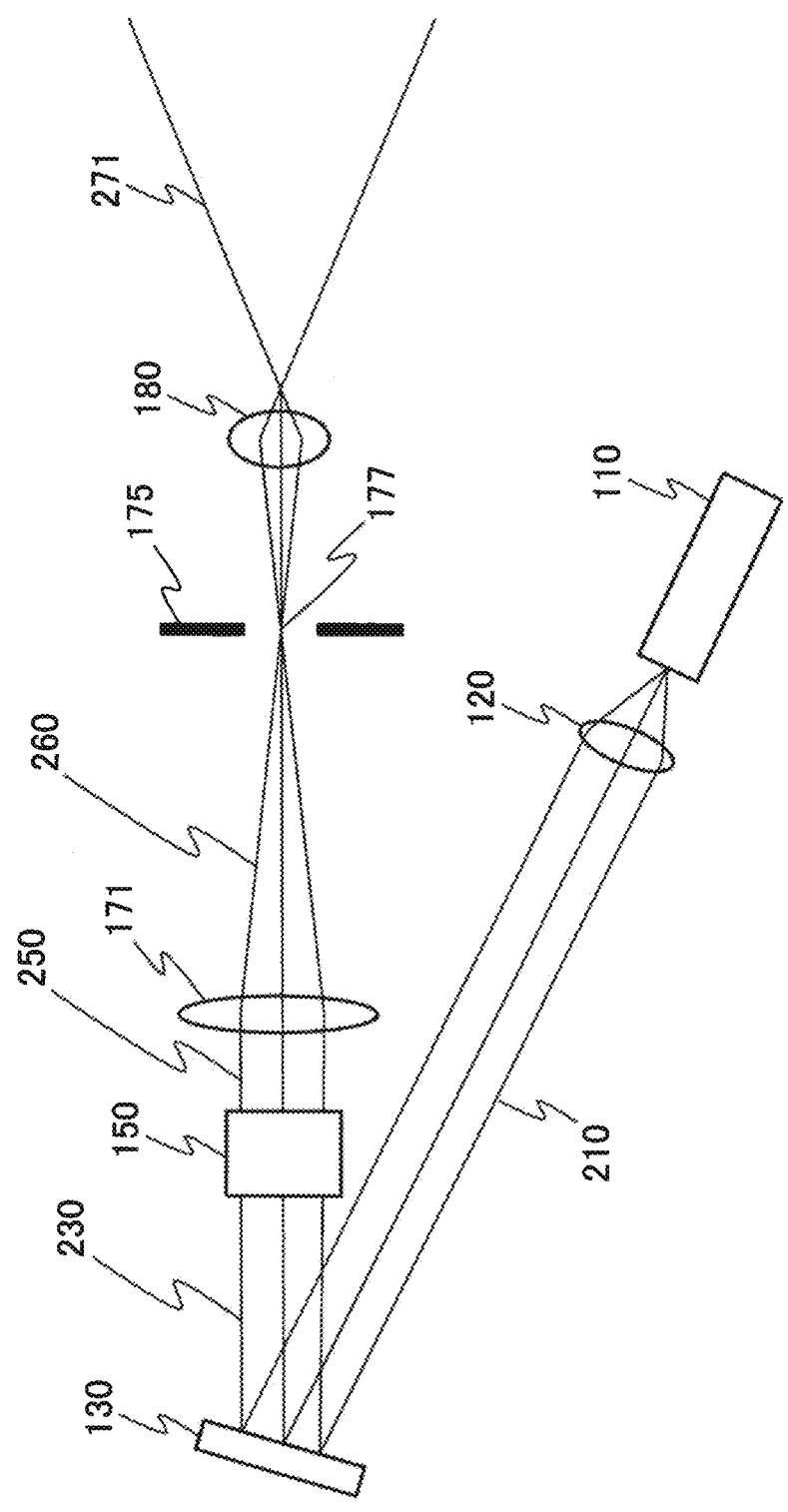
FIG. 9 is a conceptual diagram illustrating the structure of the projection apparatus according to the first exemplary embodiment of the invention.

In the phase-modulation-type projection apparatus, high-order light, such as second or higher-order light, is generated by the Fourier transform lens. FIG. 9 illustrates a structure that can remove high-order light.

FIG. 9 is a conceptual diagram illustrating the structure of a projection apparatus according to this exemplary embodiment. The projection apparatus illustrated in FIG. 9 includes a laser light source 110, a collimator lens 120, a phase-modulation-type modulation element 130, an unnecessary component removal means 150, a Fourier transform lens 171, a light shield 175, and a projection lens 180. In FIG. 9, only one laser light source is illustrated. However, in practice, a plurality of laser light sources are arranged in the vertical direction in the plane of paper. In FIG. 9, the distance relationship between components is not accurately illustrated.

The laser light source 110 and the collimator lens 120 are included in the light source 11 illustrated in FIG. 1. The collimator lens 120 converts a laser beam emitted from the light source 110 into parallel light (laser beam 210). The phase-modulation-type modulation element 130 has the functions of the modulation means 13 illustrated in FIG. 1. The unnecessary light removal means 150 includes the functions of the unnecessary component removal means 15 illustrated in FIG. 1. The Fourier transform lens 171 and the projection lens 180 are included in the projection means 17 illustrated in FIG. 1. The light shield 175 shields high-order light that is included in a laser beam 260 transmitted through the Fourier transform lens 171.

A laser beam emitted from the laser light source 110 is converted into parallel light by the collimator lens 120 and the parallel light becomes the laser beam 210. A laser beam 230 is obtained by modulating a laser beam using the phase-modulation-type modulation element 130 and includes an unnecessary component. A laser beam 250 is obtained by removing unnecessary light from the laser beam 230 using the unnecessary component removal means 150. The laser beam 260 is obtained by performing Fourier transform for the laser beam 250 using the Fourier transform lens 171. A focus position 177 is the focus position of the Fourier transform lens 171. Projection light 271 is light that is projected by the projection lens 180 and forms an image on a projected object.

The Fourier transform lens 171 is arranged at a position that is separated from the phase-modulation-type modulation element 130 by the focal length. Therefore, an image obtained by performing Fourier transform for the image displayed on the phase-modulation-type modulation element 130 is formed at the focus position 177. The light shield 175 absorbs high-order light at the focus position 177 such that the high-order light does not travel in the projection direction. That is, the light shield 175 is arranged at the focus position of the laser beam Fourier-transformed by the Fourier transform lens 171 such that high-order light is shielded. High-order light is removed from the Fourier-transformed image by the light shield 175 and the Fourier-transformed image is enlarged and projected by the projection lens 180.

In the example illustrated in FIG. 9, when the focal length of the Fourier transform lens 171 is f1 and the focal length of the projection lens 180 is f2, the image is projected at a magnification of f1/f2.

In general, a bright spot which is called zero-order light is located at the center of the Fourier-transformed image. The zero-order light is direct current (DC) light. The zero-order light can be theoretically zero. However, in practice, the zero-order light is present. In order to remove the zero-order light, the optical system including the unnecessary component removal means 150 and the Fourier transform lens 171 may deviate such that the light shield 175 absorbs the zero-order light.

Chromatic Aberration

Here, the chromatic aberration of a general convex lens will be described with reference to FIG. 10.

Figure 10:
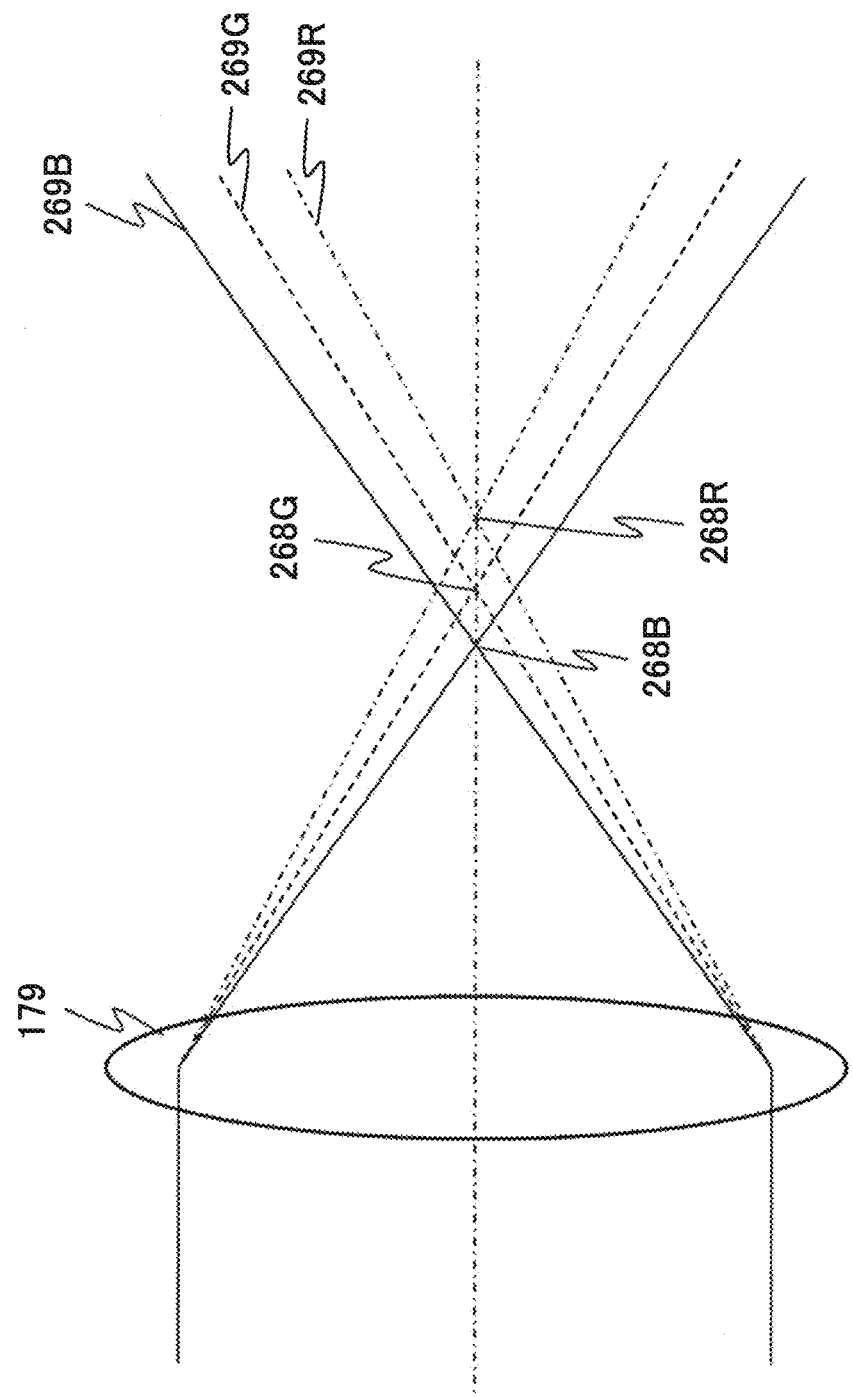
FIG. 10 is a conceptual diagram illustrating the chromatic aberration of a general lens.

FIG. 10 illustrates an example in which visible light is refracted by a convex lens 179. In FIG. 10, blue light 269B (solid line), green light 269G (dashed line), and red light 269R (one-dot chain line) are illustrated as refracted light. Focus positions 268B, 268G, and 268R indicate the focus positions of the blue light, the green light, and the red light, respectively.

As illustrated in FIG. 10, the chromatic aberration causes the focus position 268R of the red light with the longest wavelength to be furthest from the convex lens 179 and causes the focus position 268G of the blue light with the shortest wavelength to be closest to the convex lens 179. In the projection apparatus according to this exemplary embodiment, the Fourier transform lens has the same characteristics as the convex lens illustrated in FIG. 10.

Therefore, in this exemplary embodiment, it is preferable that light with the shortest wavelength be set to the first laser light source having the shortest optical path length to the Fourier transform lens 171 and light with a longer wavelength be set as the optical path length to the Fourier transform lens 171 becomes larger.

In the examples illustrated in FIGS. 5 to 8, the optical path difference between each laser light source and the Fourier transform lens 171 is not accurately illustrated. For example, FIG. 6 illustrates an example of the design in which the distance from the modulation element 130 to the Fourier transform lens 171 is 50 mm and the distance between the dichroic mirror 521 and the mirror 523 is 3 mm. It is possible to create aberration in this range according to the design of the lens.

Fourier Transform Lens

It is necessary to reduce the size of the projection apparatus in order to achieve an interface apparatus using the projection apparatus according to the invention as a wearable system. In the wearable system, it is assumed that a projected body is close to an operator.

As illustrated in FIG. 9, the projection lens is needed in order to enlarge and project an image. When the focal length of the Fourier transform lens is f1 and the focal length of the projection lens is f2, the magnification of the projection lens is f1/f2. In order to project an image at a position that is close to the operator, such as the hand of the operator, it is necessary to increase the magnification of the projection lens such that the focal length f2 of the projection lens is very short. For example, the focal length f2 of the projection lens may be set to about 1 mm to 2 mm. Under this condition, the chromatic aberration illustrated in FIG. 10 causes a big problem. This is because a magnification varies depending on colors.

Figure 11:
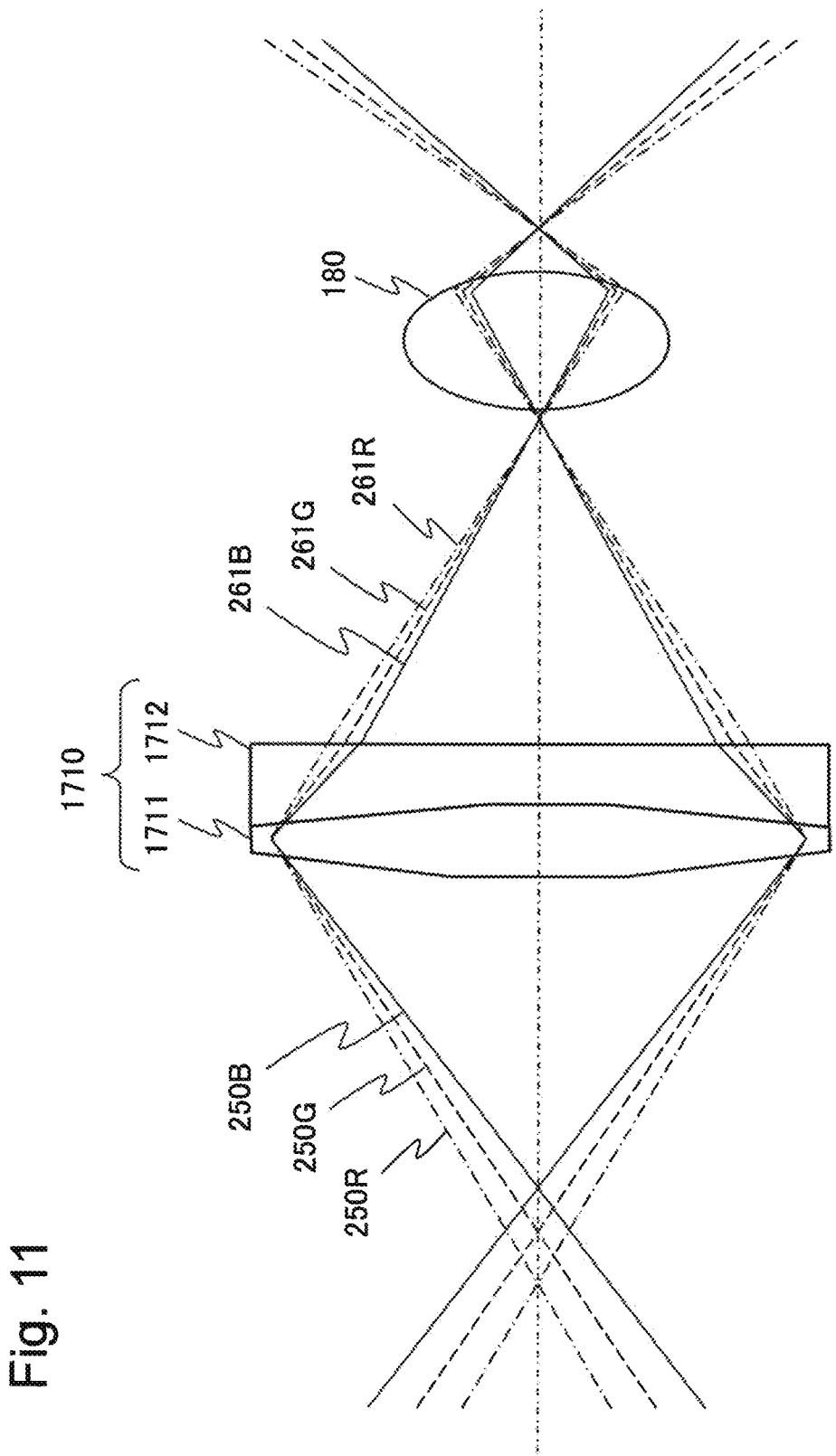
FIG. 11 is a conceptual diagram illustrating an example of a Fourier transform lens in the projection apparatus according to the first exemplary embodiment of the invention.

In this exemplary embodiment, the problem of chromatic aberration is solved by an optical system illustrated in FIG. 11.

FIG. 11 is a conceptual diagram illustrating an example of a Fourier transform lens according to this exemplary embodiment. A Fourier transform lens 1710 illustrated in FIG. 11 is a combination of a convex lens 1711 with low dispersion and a concave lens 1712 with high dispersion. For example, the convex lens 1711 can be made of crown glass and the concave lens 1712 can be made of flint glass. The magnitude relationship between the dispersion of the convex lens 1711 and the dispersion of the concave lens 1712 is relative. In general, it is preferable that the concave lens 1712 be made of a high-dispersion material.

That is, the Fourier transform lens 1710 has a structure in which the convex lens with low dispersion is arranged close to the modulation element (not illustrated) and the concave lens with high dispersion is arranged close to the projection lens 180. The Fourier transform lens 1710 is arranged such that color laser beams have different focuses varies on the convex lens side and color laser beams have the same focus on the concave lens side.

FIG. 11 illustrates an example in which blue light 250B (solid line), green light 250G (dashed line), and red light 250R (one-dot chain line) are incident on the Fourier transform lens 1710. Blue light 261B (solid line), green light 261G (dashed line), and red light 261R (one-dot chain line), which are laser beams Fourier-transformed by the Fourier transform lens 1710, are enlarged and projected by a projection lens 180.

In the example illustrated in FIG. 11, the convex lens 1711 and the concave lens 1712 are combined with each other such that color laser beams have different focuses on the side of the convex lens 1711 to remove the optical path difference between the optical systems and color laser beams have substantially the same focus position on the side of the concave lens 1712 to uniformize a magnification. As a result, it is possible to solve the problem of chromatic aberration which occurs when only the convex lens 179 illustrated in FIG. 10 is used.

Polarization Direction

Next, the polarization direction of the laser beam emitted to the modulation element of the projection apparatus according to this exemplary embodiment will be described with reference to FIGS. 12 and 13. In general, an elliptical beam is emitted from a semiconductor laser and the polarization direction of the elliptical beam is the direction of the minor axis of an ellipse.

Figure 12:
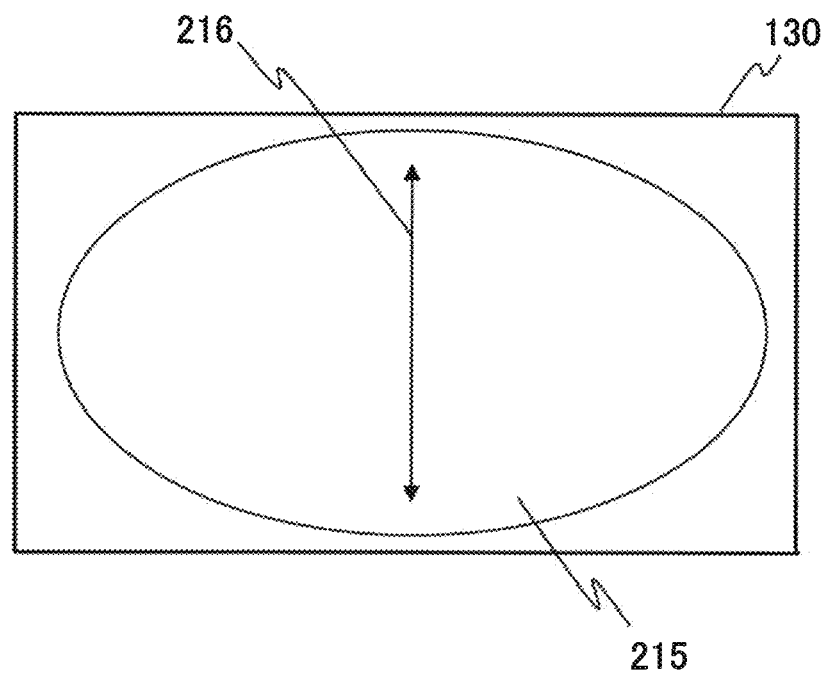
FIG. 12 is a conceptual diagram illustrating an example of a beam pattern when monochromatic light is emitted to a phase-modulation-type modulation element.

FIG. 12 illustrates an example in which monochromatic light is used. In the case of monochromatic light, a beam spot 215 of the laser beam emitted to the display region of the modulation element 130 does not overlap laser beams of other colors. Therefore, the elliptical beam spot 215 emitted onto the modulation element 130 is set such that a polarization direction 216 is parallel to the direction of the short side of the modulation element 130, which makes it possible to increase an irradiation area.

Figure 13:
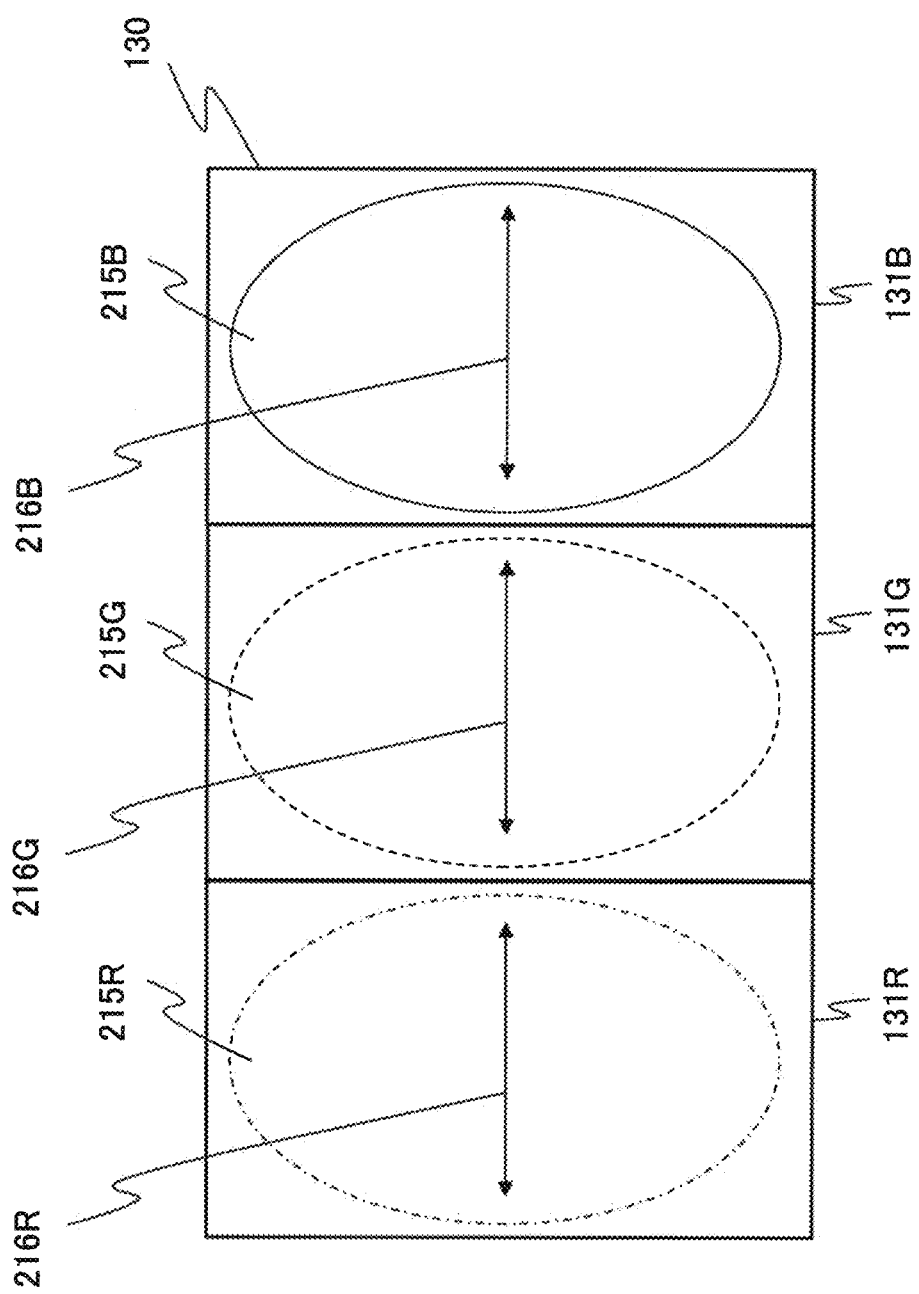
FIG. 13 is a conceptual diagram illustrating an example of a beam pattern when polychromatic light is emitted to the phase-modulation-type modulation element.

FIG. 13 illustrates an example in which polychromatic light is used as in this exemplary embodiment. In the case of polychromatic light, when the polarization direction of the laser beams of each color is parallel to the direction of the short side of the modulation element 130, the number of components that protrude from the display regions corresponding to each color increases with an increase in the diameter of the beam spot. Therefore, as illustrated in FIG. 13, the polarization directions 216R, 216G, and 216B of beam spots 215R, 215G, and 215B of each color are set so as to be parallel to the long side of the modulation element 130. When the polarization directions 216R, 216G, and 216B of the beam spots 215R, 215G, and 215B of each color are parallel to the direction of the long side of the modulation element 130, the polarization directions 216R, 216G, and 216B are parallel to the direction of the short side of each display region. Therefore, it is possible to increase the irradiation area of each of the beam spots 215R, 215G, and 215B.

The projection apparatus according to the first exemplary embodiment of the invention has been described above.

Second Exemplary Embodiment

Next, a projection apparatus according to a second exemplary embodiment of the invention will be described.

Figure 14:
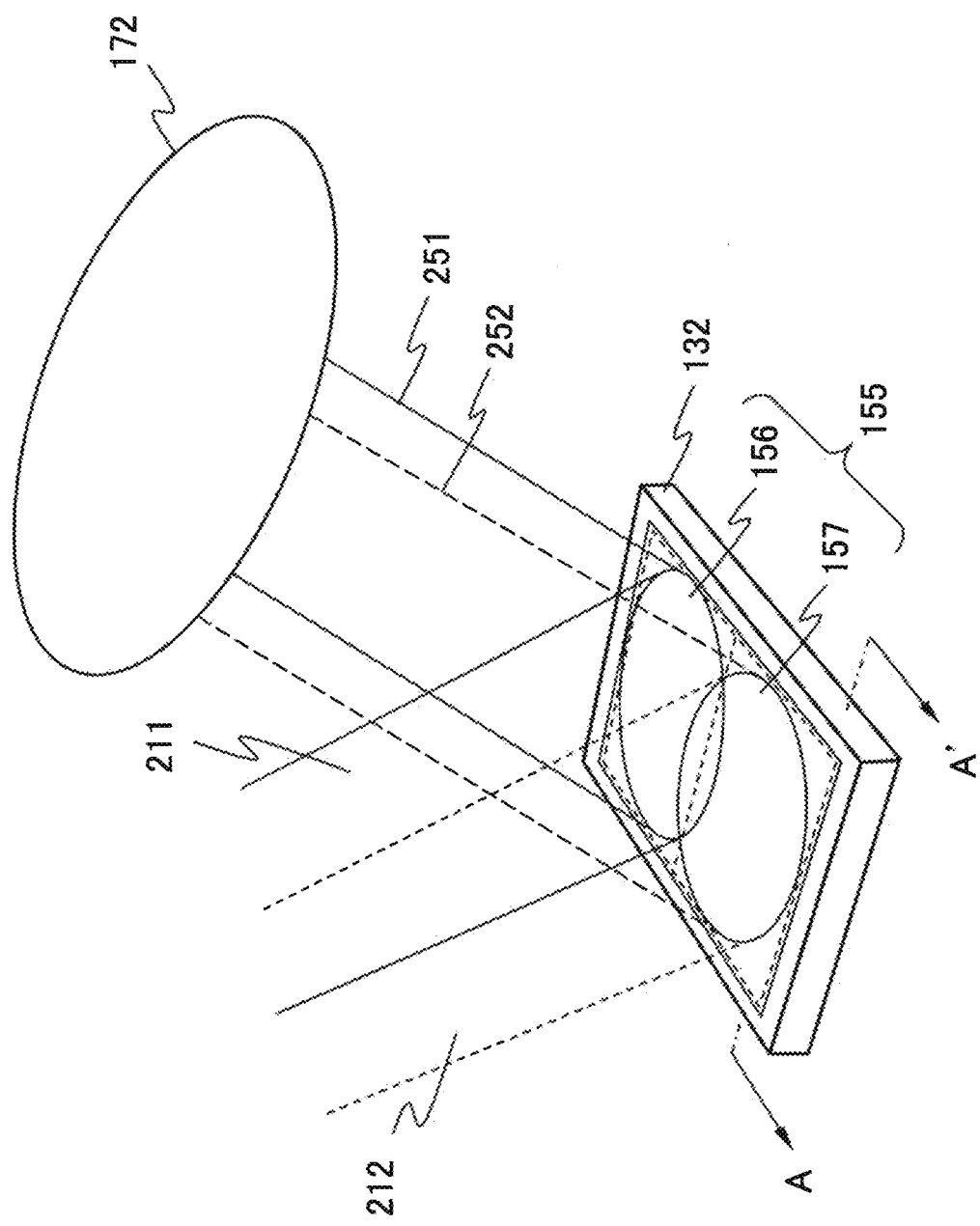
FIG. 14 is a conceptual diagram illustrating an optical system of a projection apparatus according to a second exemplary embodiment of the invention.

FIG. 14 is a conceptual diagram illustrating an optical system including a modulation element and a Fourier transform lens of the projection apparatus according to the second exemplary embodiment of the invention. Since the other structures are the same as those in the first exemplary embodiment, the detailed description thereof will not be repeated.

As illustrated in FIG. 14, the projection apparatus according to this exemplary embodiment has a structure in which band-pass color filters corresponding to the wavelengths of each laser beam are arranged on a display surface of a modulation element on which laser beams of a plurality of colors emitted from a laser light source (not illustrated) are incident. That is, in this exemplary embodiment, the band-pass filter that selectively transmits the laser beam of a color corresponding to each display region for modulating any one of the laser beams of a plurality of colors is arranged as an unnecessary component removal means.

A first color filter 156 is a color filter that transmits the wavelength of a laser beam 211 (solid line) emitted from a first laser light source (not illustrated) as a center wavelength. A second color filter 157 is a color filter that transmits the wavelength of a laser beam 212 (dashed line) emitted from a second laser light source (not illustrated) as a center wavelength. These color filters form an unnecessary component removal means 155. Preferably, the band-pass color filter used in this exemplary embodiment is made of, for example, an optical multilayer thin film and does not scatter light.

Laser beams 251 (solid line) and 252 (dashed line) which have been modulated by a modulation element 132 and then transmitted through the first and second color filters 156 and 157 are emitted to a Fourier transform lens 172.

Figure 15:
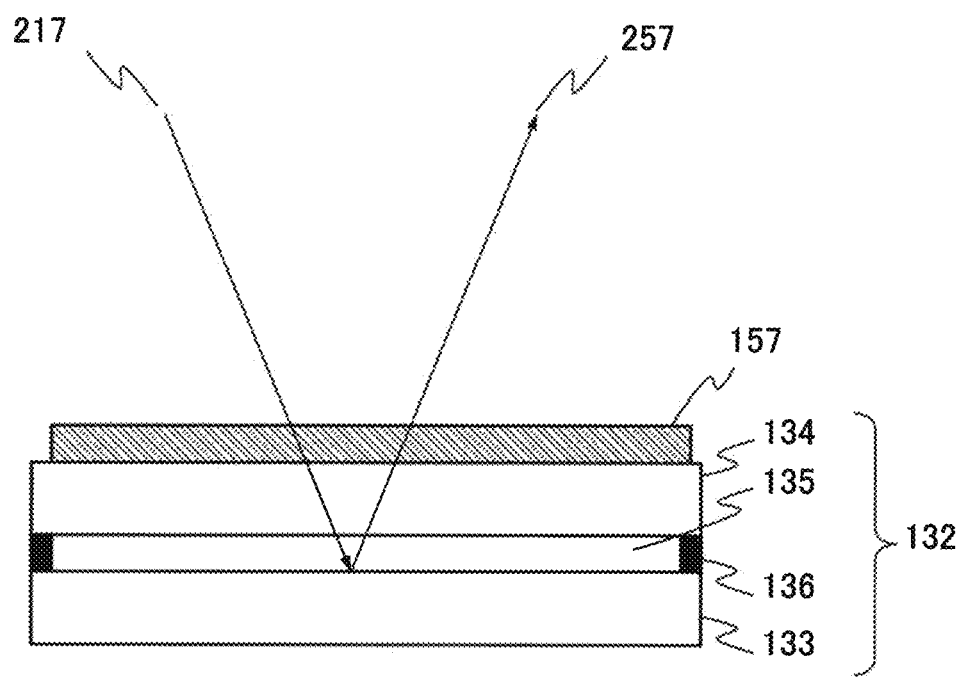
FIG. 15 is a cross-sectional view illustrating a modulation element in the projection apparatus according to the second exemplary embodiment of the invention.

FIG. 15 is a cross-sectional view illustrating the modulation element 155 taken along the line A-A' of FIG. 14 as viewed from the A-A' direction.

The modulation element 132 includes a silicon substrate 133, a glass substrate 134, liquid crystal 135, and a partition 136. A modulation array is formed on a main surface of the silicon substrate 133. The partition 136 supports the silicon substrate 133 and the glass substrate 134 and is arranged in a frame shape along the periphery of the modulation element 132. The color filter 156 or 157 is arranged on an upper surface of the glass substrate 134 which is arranged on the display surface side of the modulation element 132.

In FIG. 15, two arrows are illustrated. The first arrow indicates an incident direction 217 and indicates the incident direction of the laser beams 211 (solid line) and 212 (dashed line) illustrated in FIG. 14. The second arrow indicates an emission direction 257 and indicates the emission direction of the laser beams 251 (solid line) and 252 (dashed line) illustrated in FIG. 14 which have been modulated and generated by the modulation element 132.

The color filter 156 transmits the wavelength of the laser beam 211 emitted from the first laser light source as the center wavelength and does not transmit the laser beam 212 emitted from the second laser light source. Therefore, the laser beam 212 is not mixed in the display region corresponding to the laser beam 211 and only the laser beam 211 is modulated and emitted. Similarly, the laser beam 211 is not mixed in the display region corresponding to the laser beam 212 and only the laser beam 212 is modulated and emitted.

In the second exemplary embodiment, the optical system (unnecessary component removal means) that removes unnecessary components from the laser beams and guides only the necessary components to be projected is formed by the band-pass color filters. Each of the band-pass color filters prevents light with an unnecessary wavelength from being incident on and being emitted from the display regions corresponding to each color.

However, when the band-transmission color filters are used, there are two points to note in terms of the design.

One point is that a color filter which is used in, for example, a liquid crystal display is not used as the band-pass color filter. A general color filter is mainly made of a material including a dye or a pigment and scatters light. Therefore, when the general color filter is applied to the projection apparatus according to this exemplary embodiment, the wave front of the laser beam is broken, which is not practical.

The other point is response to the incident and emission directions of light. A general optical multilayer thin film has wavelength selectivity according to a combination of the refractive index and thickness of a multilayer film. As a result, since the effective thickness of the film increases depending on the incident direction of light, the film needs to be designed, considering wavelength selectivity. In this exemplary embodiment, as illustrated in FIG. 15, light with a selected wavelength which has been obliquely incident in the incident direction 217 and then transmitted through the band-pass color filter 156 or 157 passes through the glass substrate 134 and the liquid crystal 135 and is reflected from an electrode on the surface of the silicon substrate 133. Then, the light reflected from the electrode on the surface of the silicon substrate 133 passes through the liquid crystal 135 and the glass substrate 134, is filtered by the band-pass color filter 156 or 157 again, and is emitted in the emission direction 257. Therefore, the band-pass color filter needs to have wavelength selectivity centering on the wavelength of light in directions corresponding to the incident direction 217 and the emission direction 257 of light. When the band-pass color filter has wavelength selectivity centering on the wavelength of light in directions corresponding to the incident direction 217 and the emission direction 257 of light, it is possible to minimize the attenuation of light in the band-pass color filter and to obtain an apparatus with high efficiency.

Fourier Transform Lens

Figure 16:
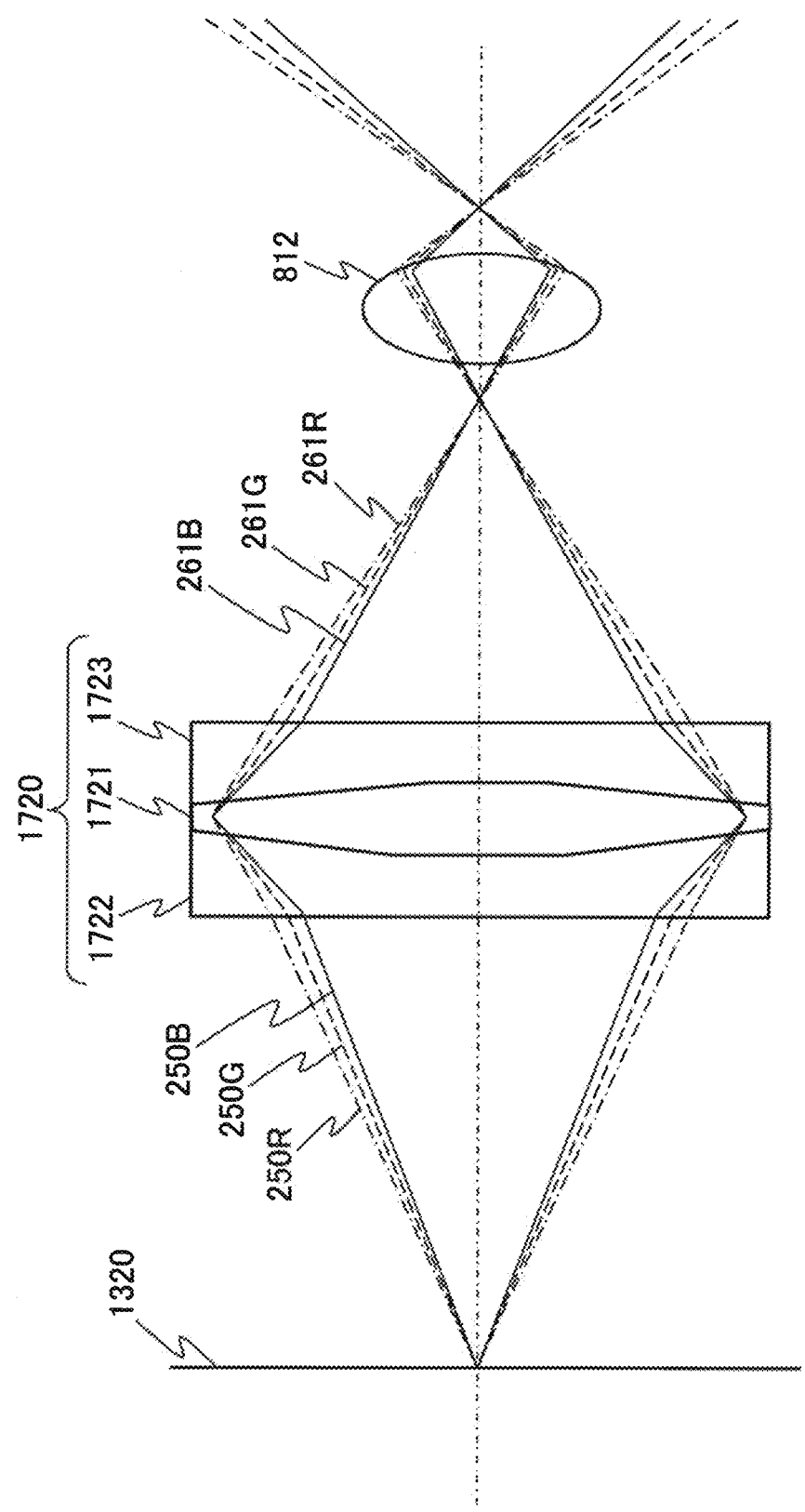
FIG. 16 is a conceptual diagram illustrating an example of a Fourier transform lens in the projection apparatus according to the second exemplary embodiment of the invention.

FIG. 16 illustrates an example of an optical system included in the projection apparatus according to the second exemplary embodiment of the invention. FIG. 16 illustrates an example of an optical system which is arranged between a display surface 1320 of a phase-modulation-type modulation element 132 and a projection lens 812.

FIG. 16 illustrates an example of the use of a Fourier transform lens 1720 in which concave lenses 1722 and 1723 made of flint glass with high dispersion are bonded to both surfaces of a convex lens 1721 made of crown glass with low dispersion. The Fourier transform lens 1720 has a structure in which the concave lens 1722 (first concave lens) is arranged close to the modulation element 132, the concave lens 1723 (second concave lens) is arranged close to the projection lens 812, and the convex lens 1721 is arranged between the concave lenses 1722 and 1723.

Blue light 250B (solid line), green light 250G (dashed line), and red light 250R (one-dot chain line) modulated by the modulation element 132 are incident on the concave lens 1722 of the Fourier transform lens 1720. The blue light 250B, the green light 250G, and the red light 250R pass through the convex lens 1721 and are emitted as blue light 261B (solid line), green light 261G (dashed line), and red light 261R (one-dot chain line) from the concave lens 1723.

In the second exemplary embodiment, the travel distances of the color laser beams from the phase-modulation-type modulation element 132 to the Fourier transform lens 1720 are equal to each other. Therefore, the focal lengths need to be equal to each other in the allowable range of the depth of focus. In addition, the focus problem of the projection lens is the same as that in the first exemplary embodiment. Therefore, it is preferable that an optical system from the phase-modulation-type modulation element 132 to the projection lens 812 have the structure illustrated in FIG. 16.

That is, the Fourier transform lens 1720 is arranged such that the focal lengths from the surface close to the modulation element 132 and the surface close to the projection lens 812 are equal to each other.

The structure illustrated in FIG. 16 enables the focal lengths from an incident surface and an emission surface of the Fourier transform lens 1720 in both directions to be equal to each other.

Modification Example 1

Figure 17:
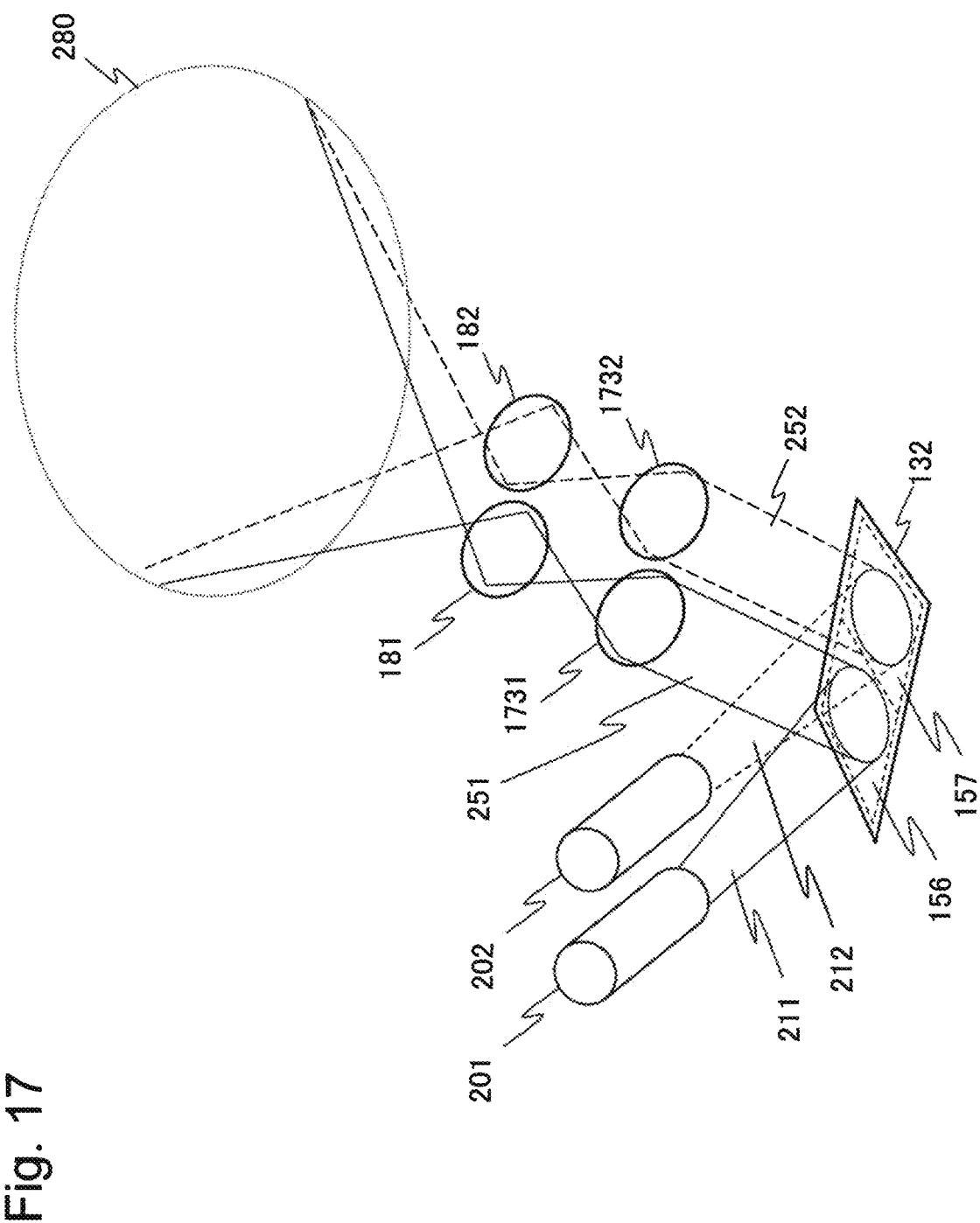
FIG. 17 is a conceptual diagram illustrating the structure of a modification example of the projection apparatus according to the second exemplary embodiment of the invention.

FIG. 17 illustrates Modification Example 1 of the projection apparatus according to the second exemplary embodiment of the invention. In FIG. 17, collimator lenses which collimate laser beams emitted from each laser light source are not illustrated. In the modification example illustrated in FIG. 17, a Fourier transform lens and a projection lens are arranged for the laser beam of each color modulated by a modulation means.

In the second exemplary embodiment, the centers of beams incident on the Fourier transform lens are not combined so as to be aligned with each other, unlike the first exemplary embodiment. Strictly speaking, the positions of the centers of images deviate from each other. In the example illustrated in FIG. 17, the Fourier transform lens and the projection lens are arranged for each color and the center of the beam incident on the Fourier transform lens is adjusted.

A laser beam 211 (solid line) emitted from a first laser light source 201 is selectively transmitted through a first color filter 156, is modulated by a modulation element 132, and is emitted as a laser beam 251 (solid line). Then, the laser beam 251 is Fourier-transformed by a first Fourier transform lens 1731 and is projected to the range of a project region 280 by a projection lens 181.

Similarly, a laser beam 212 (dashed line) emitted from a second laser light source 202 is selectively transmitted through a second color filter 157, is modulated by the modulation element 132, and is emitted as a laser beam 252 (dashed line). Then, the laser beam 252 is Fourier-transformed by a second Fourier transform lens 1732 and is projected to the range of the project region 280 by a projection lens 182.

In the structure illustrated in FIG. 17, the design and arrangement of the first and second Fourier transform lenses 1731 and 1732 and the first and second projection lenses 181 and 182 are appropriately set. As a result, it is possible to accurately align the positions of images corresponding to the laser beams of each color projected by the projection lenses with the assumed positions in the range of the project region 280.

According to the structure illustrated in FIG. 17, since the Fourier transform lens and the projection lens are independently arranged for each color, it is possible to adjust the focal length for each color. Therefore, each Fourier transform lens does not need to be formed by a plurality of lenses, unlike the structure illustrated in FIG. 11 or FIG. 16.

Modification Example 2

Figure 18:
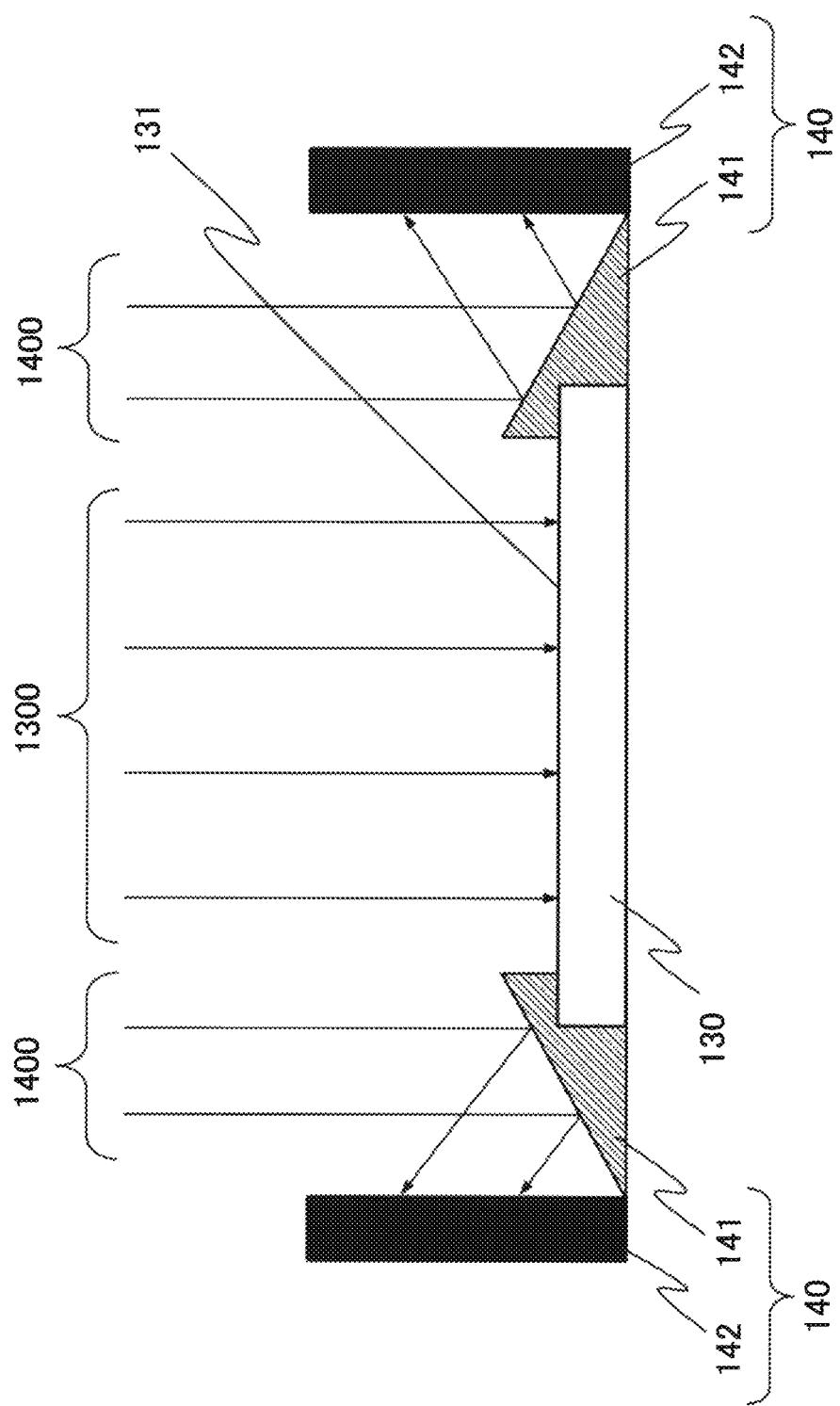
FIG. 18 is a conceptual diagram illustrating a modification example of the projection apparatus according to the first and second exemplary embodiments of the invention.

FIG. 18 illustrates Modification Example 2 of the projection apparatus according to the first and second exemplary embodiments of the invention.

As illustrated in FIG. 3, light which is spread outside the range of the phase-modulation-type modulation element becomes a noise component. In general, the noise component becomes a DC component which is called zero-order light. The noise component is not preferable in the formation of an image. This modification example prevents the generation of the noise component.

As illustrated in FIG. 18, in a projection apparatus according to this modification example, a light shielding structure 140 is arranged in the periphery of a modulation element 130. The light shielding structure 140 includes a light shield 141 (also referred to as a light shielding portion) that covers a peripheral portion of the phase-modulation-type modulation element 130 and a light absorber 142 (also referred to as a light absorption portion) that absorbs light reflected from the light shield 141.

That is, the light shielding structure 140 includes the light shield 141 that is arranged in a frame shape in the periphery of the modulation element 130, has an inclined surface which is inclined outward with respect to a display surface 131 of the modulation element 130, and reflects a laser beam incident on the inclined surface. In addition, the light shielding structure 140 includes the light absorber 142 that absorbs the laser beam reflected by the light shield 141.

In FIG. 18, among the laser beams emitted from a laser light source, components which are incident on an effective portion of the modulation element 130 are illustrated as effective components 1300 and components which are not incident on the effective portion of the modulation element 130 are illustrated as unnecessary components 1400.

As illustrated in FIG. 18, the light shield 141 has an incline surface that is inclined with respect to the incident direction of the unnecessary component 1400. The unnecessary component 1400 that is incident on the inclined surface of the light shield 141 is guided to the light absorber 142. The unnecessary component 1400 guided to the light absorber 142 is absorbed by the light absorber 142. Therefore, there is no stray light. In addition, the light shield 141 may have light absorbability. However, when the light shield 141 absorbs light, the temperature of the modulation element 130 increases. Therefore, this structure is not preferable according to conditions. For this reason, it is preferable that most of the unnecessary components 1400 be absorbed by the light absorber 142.

As described above, according to this modification example, it is possible to remove light that is spread beyond the range of the phase-modulation-type modulation element and thus to prevent the generation of zero-order light.

Third Exemplary Embodiment

When an interface system that displays an image with a small projection area, such as a line image or a character, is constructed using a phase-modulation-type projection apparatus, it is possible to achieve an inexpensive system with low power consumption and a small size. In particular, for example, when a work support system for business purposes outputs an instruction to an operator or outputs a mark for identifying an object, it needs only to project a line image or a character and is very useful as an interface system. In addition, the phase-modulation-type projection apparatus can be miniaturized so as to be worn on the body. Therefore, it is possible to achieve a so-called wearable interface system.

In the wearable interface system, there is a demand for multiple colors, in order to classify the colors of the images to be projected such that a certain classification is red and another classification is green, thereby improving distinguishability. The term "multicolor system" used herein includes a system that separately displays colors, without combining the colors.

A third exemplary embodiment of the invention relates to the above-mentioned wearable interface apparatus.

Figure 19:
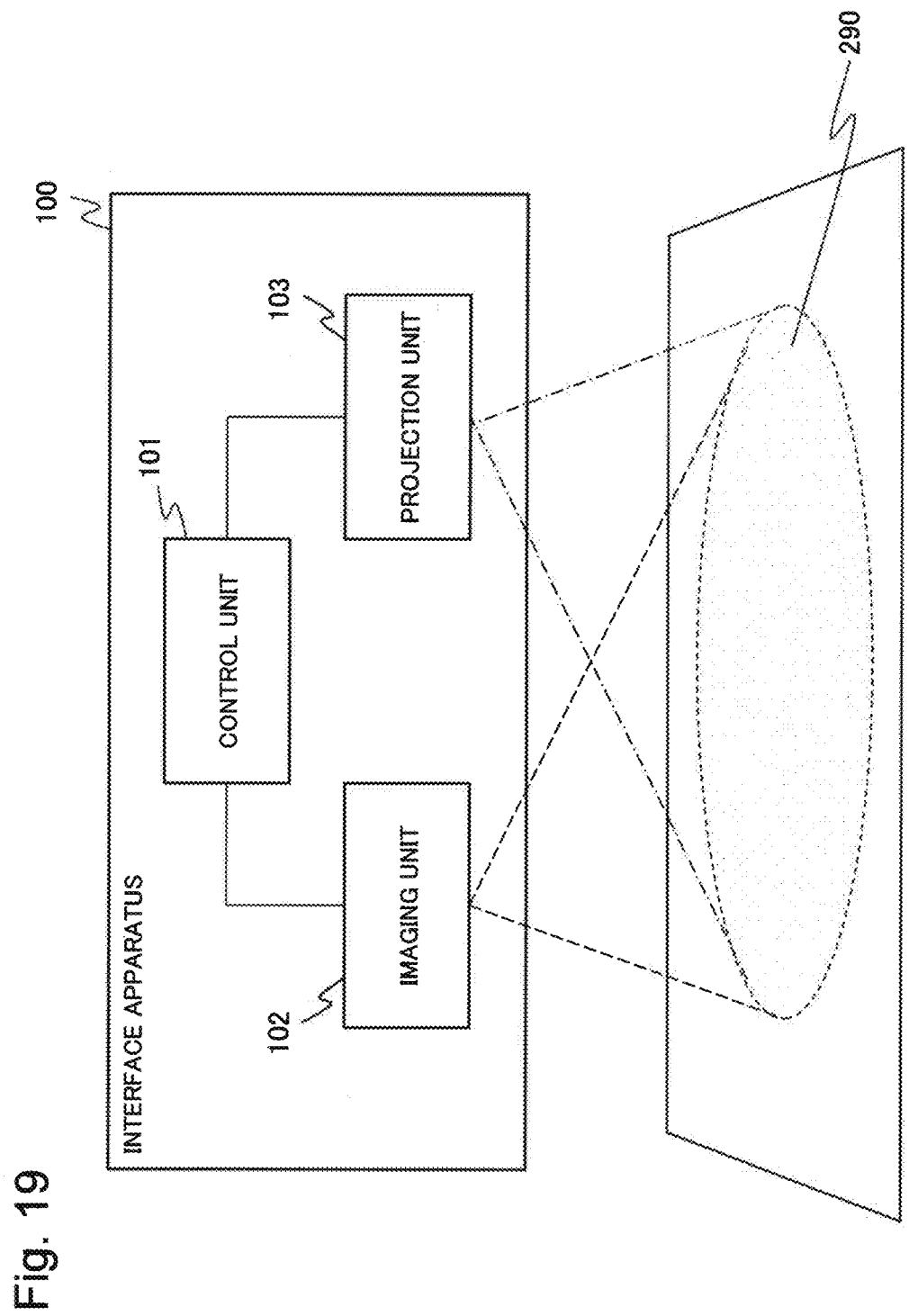
FIG. 19 is a block diagram illustrating the structure of an interface apparatus according to a third exemplary embodiment of the invention.

As illustrated in FIG. 19, an interface apparatus 100 according to this exemplary embodiment includes a control unit 101, an imaging unit 102, and a projection unit 103. The projection unit 103 of the interface apparatus 100 according to this exemplary embodiment has the functions of the projection apparatus according to the first or second exemplary embodiment.

The control unit 101 controls the overall operation of the interface apparatus 100. The control unit 101 acquires the image captured by the imaging unit 102 and recognizes, as an operation, the position or motion of the finger or hand of an operator which is included in the acquired image. The control unit 101 provides an appropriate image signal based on the recognized result to the projection unit 103 and directs the projection unit 103 to project an appropriate image. In addition, the control unit 101 performs control such that the imaging unit 102 captures the position of images displayed in each color, coordinates indicating the positional relationship between a projection image and the captured image are clarified, and the images of each color are matched with each other. The control unit 101 can be achieved by the function of a microcomputer including, for example, an arithmetic device or a control device.

That is, the control unit 101 provides image information corresponding to an operation for the image of, for example, a user interface in the region captured by the imaging unit 102 to the projection unit 103 and controls the projection unit 103 such that the image information is projected.

The imaging unit 102 captures an image of a region including an operation region 290 in which an interface operation is performed. The imaging unit 102 can be achieved by, for example, the function of a general camera. In addition, the imaging unit 102 may have a function that can capture light, such as infrared light or ultraviolet light with wavelengths other than visible light. In addition, for example, the imaging unit 102 may have the function of a depth sensor or a time-of-flight (TOF) camera.

The projection unit 103 projects an image including a user interface (hereinafter, referred to as a UI) to the operation region 290 that receives the operation of the operator, under the control of the control unit 101. The projection unit 103 has the functions of the projection apparatus according to the first or second exemplary embodiment.

Next, the operation of the interface apparatus 100 according to this exemplary embodiment will be described with reference to a flowchart illustrated in FIG. 20.

Figure 20:
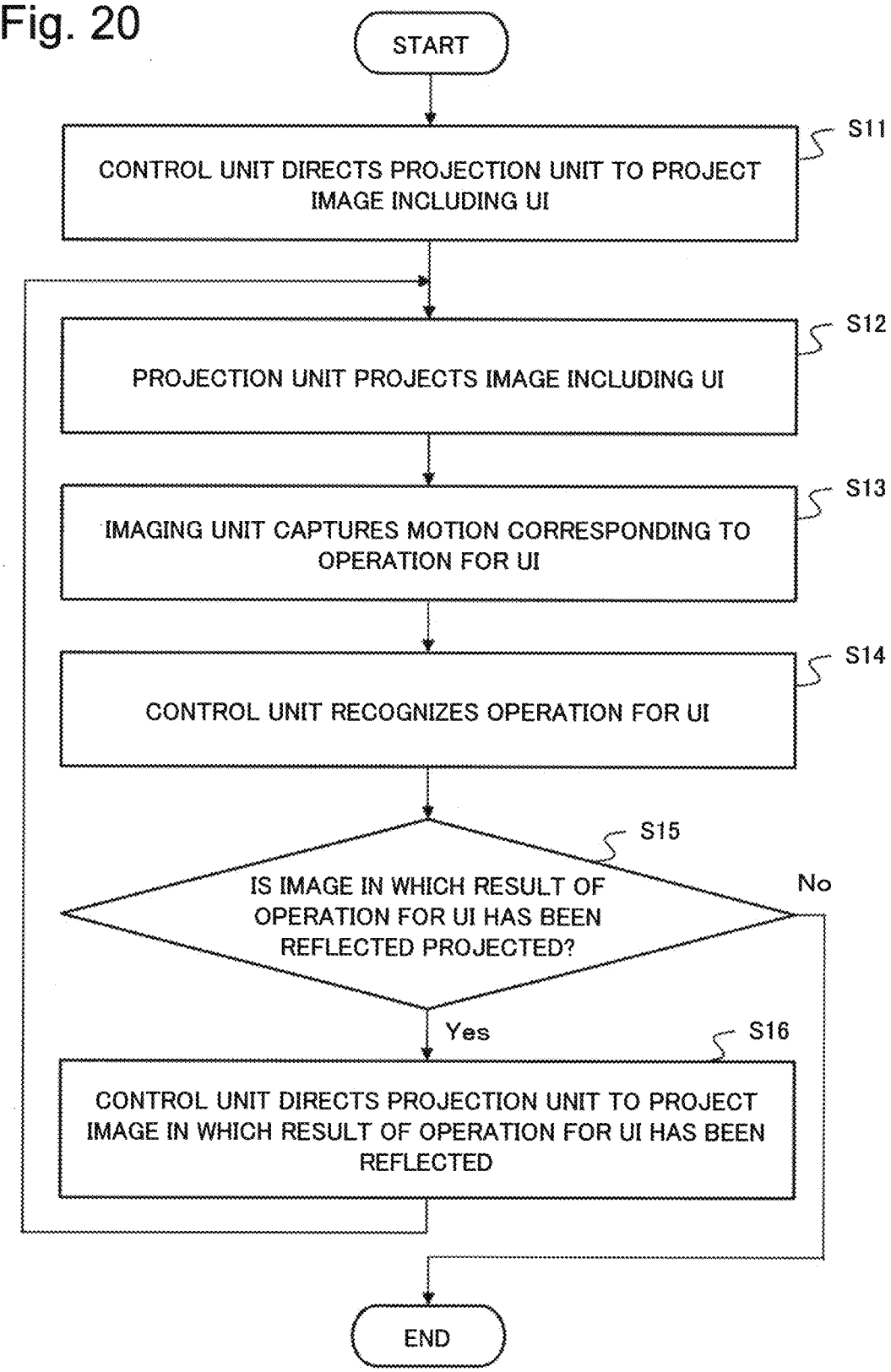
FIG. 20 is a flowchart illustrating the operation of the interface apparatus according to the third exemplary embodiment of the invention.

In FIG. 20, first, when the interface apparatus 100 is turned on and starts to operate, the control unit 101 controls the projection unit 103 such that an image including a UI for receiving the operation of the operator is projected (Step S11).

The projection unit 103 projects an image including the UI for receiving the operation of the operator to the operation region 290 under the control of the control unit 101 (Step S12).

The imaging unit 102 captures the motion (position or movement) of, for example, the finger or hand of the operator corresponding to an operation for the UI which is included in the image projected by the projection unit 103 (Step S13).

The control unit 101 recognizes the operation of the operator captured by the imaging unit 102 (Step S14).

Here, when an image in which the operation result of the operator has been reflected is projected (Yes in Step S15), the control unit 101 controls the projection unit 103 such that the image in which the operation result has been reflected is projected (Step S16).

After Step S16, the process returns to Step S12. The process from Step S12 to Step S16 is repeated until the process of projecting the image in which the operation result of the operator has been reflected ends (No in Step S15).

The operation has been described above with reference to the flowchart illustrated in FIG. 20.

Figure 21:
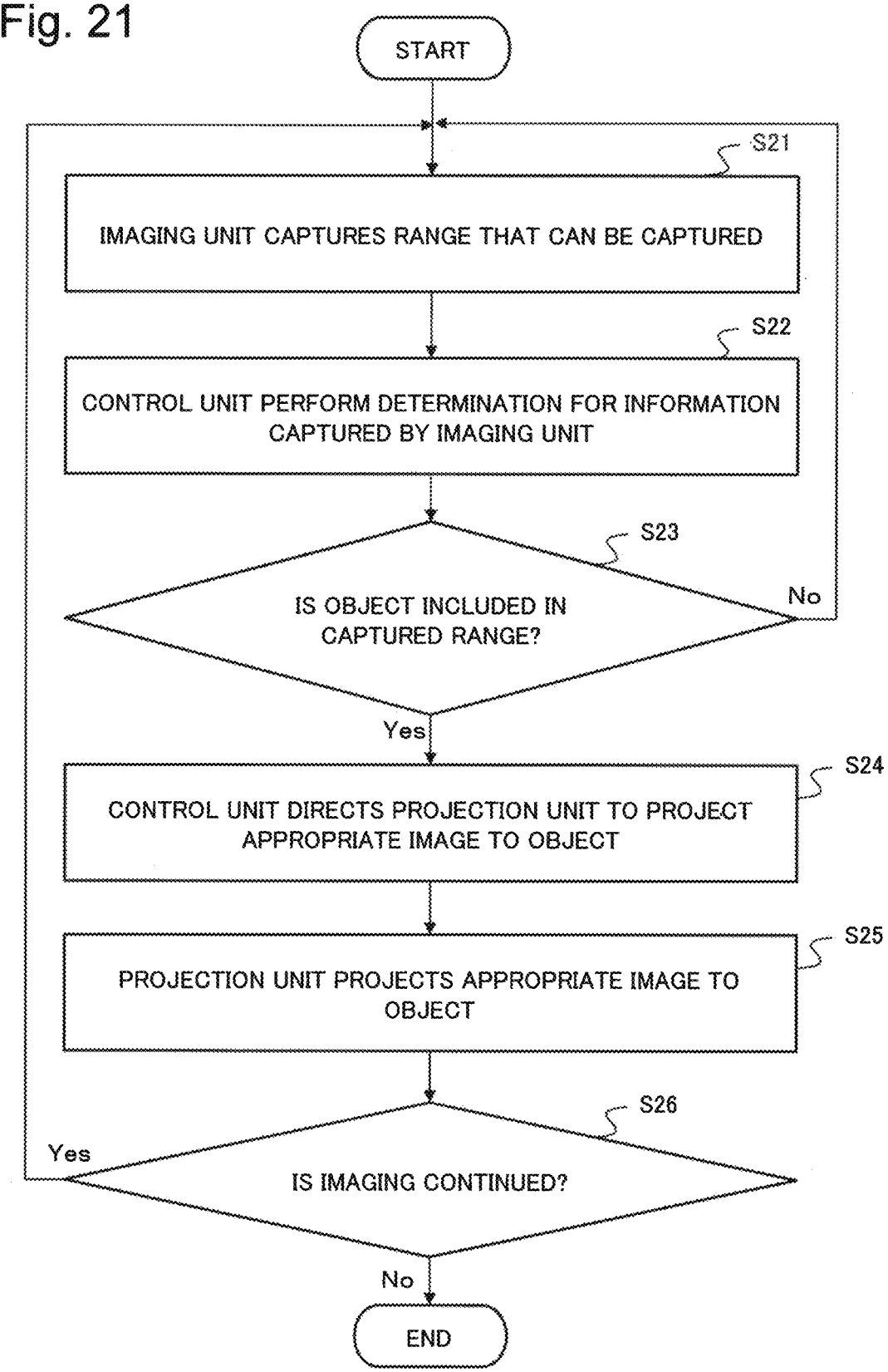
FIG. 21 is a flowchart illustrating the operation of the interface apparatus according to the third exemplary embodiment of the invention.

In addition, the interface apparatus 100 according to this exemplary embodiment may perform an operation different from that illustrated in FIG. 20, as illustrated in the flowchart of FIG. 21. In the operation illustrated in the flowchart of FIG. 21, the information of an object is transmitted to the operator.

When the interface apparatus 100 is turned on, it operates as follows.

In FIG. 21, first, the imaging unit 102 captures the range which can be captured (Step S21). In addition, the imaging unit 102 may start imaging under the control of the control unit 101.

The control unit 101 performs determination for information captured by the imaging unit 102 (Step S22). For example, the control unit 101 determines whether an object is included in the captured range.

When an object is included in the captured range (Yes in Step S23), the control unit 101 recognizes the captured object and directs the projection unit 103 to project an appropriate image to the object (Step S24). When no objects are included in the captured range (No in Step S23), the process returns to Step S21.

The projection unit 103 projects an image including information about the object to the object under the control of the control unit 101 (Step S25). In addition, an appropriate image may be projected not to the object, but to the vicinity of the object or the position related to the object. In this case, the interface apparatus 100 according to this exemplary embodiment can project a multicolor image. Therefore, it is possible to project the image that is easier to identify and understand than a monochromatic image.

When the imaging unit 102 continues to perform imaging (Yes in Step S26), the process returns to Step S21. The process from Step S21 to Step S25 is repeated until the imaging operation of the imaging unit 102 ends (No in Step S26).

The operation has been described above with reference to the flowchart illustrated in FIG. 21.

In the processes illustrated in the flowcharts of FIG. 20 and FIG. 21, the order of the steps may be changed or other steps may be added. In addition, in the processes illustrated in the flowcharts of FIG. 20 and FIG. 21, other procedures may be added or unnecessary procedures may be removed, if necessary.

It is assumed that the interface apparatus according to this exemplary embodiment is not used to combine project colors to generate another color, but is used to form, for example, a monochromatic line image or a monochromatic character. Therefore, the interface apparatus does not need to have accuracy that is as high as the positions of pixels are aligned, but needs to have accuracy that is as high as the relative positions of the images formed in each color are naturally aligned. Therefore, in this exemplary embodiment, preferably, controls is performed such that the imaging unit captures the positions of the images displayed in each color, the coordinates indicating the positional relationship between a projection image and the captured image are clarified, and the images of each color are matched with each other. This control makes it possible to project the images of each color such that the relative positions of the projection images of each color do not deviate from each other even when the operation region is changed due to the movement of the operator.

Application Examples

Figure 22:
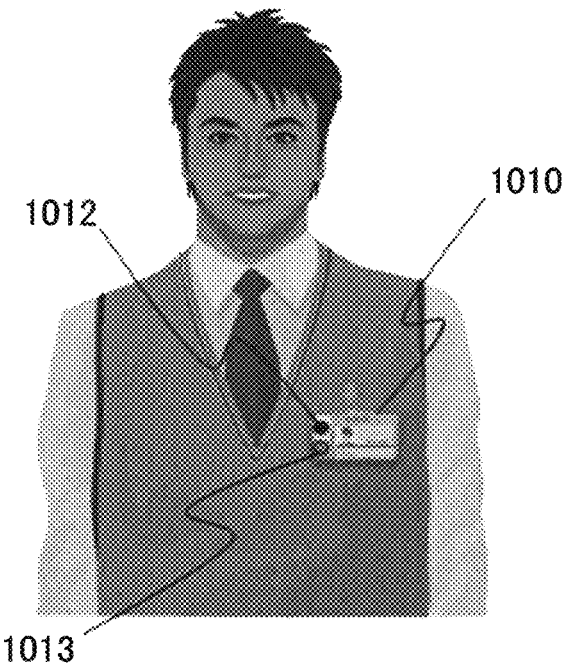
FIG. 22 is a conceptual diagram illustrating an example of the interface apparatus according to the third exemplary embodiment of the invention.
Figure 23:
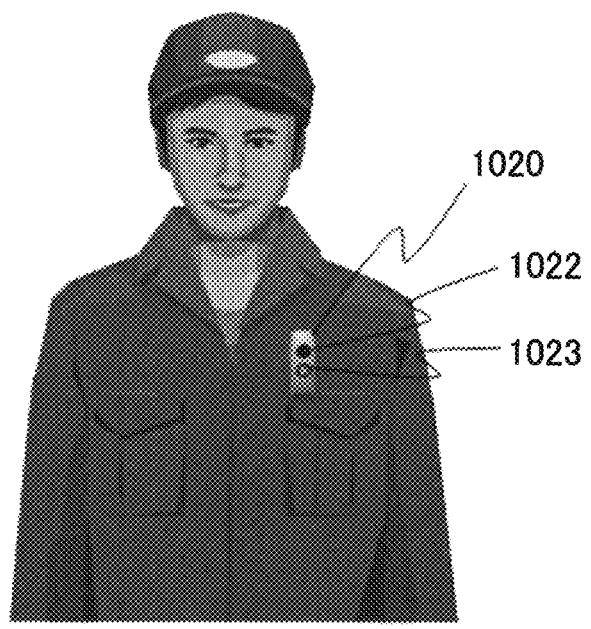
FIG. 23 is a conceptual diagram illustrating an example of the interface apparatus according to the third exemplary embodiment of the invention.

FIGS. 22 and 23 illustrate an application example in which the interface apparatus 100 according to the third exemplary embodiment of the invention is used as a wearable interface. FIG. 22 illustrates a nameplate-type interface apparatus 1010 and FIG. 23 illustrates a pen-type interface apparatus 1020.

As illustrated in FIG. 22, the interface apparatus 1010 includes a lens unit 1012 of a camera of the imaging unit 102 and a projection lens unit 1013 of the projection unit 103. Similarly, as illustrated in FIG. 23, the interface apparatus 1020 includes a lens unit 1022 of the camera of the imaging unit 102 and a projection lens unit 1023 of the projection unit 103. The interface apparatuses 1010 and 1020 are firmly fixed to the chest to prevent a shake during imaging or projection.

Each of the interface apparatuses illustrated in FIGS. 22 and 23 is an application example of the interface apparatus according to this exemplary embodiment. The interface apparatus according to this exemplary embodiment may be, for example, a pendant-type, wristband-type, wristwatch-type, armband-type, or badge-type wearable interface apparatus. In addition, the wearable interface apparatus according to this exemplary embodiment may be combined with, for example, a hat, clothes, a glove, a shoe, a sock, glasses, a mask, and a headlight.

Usage Scenes

Figure 25:
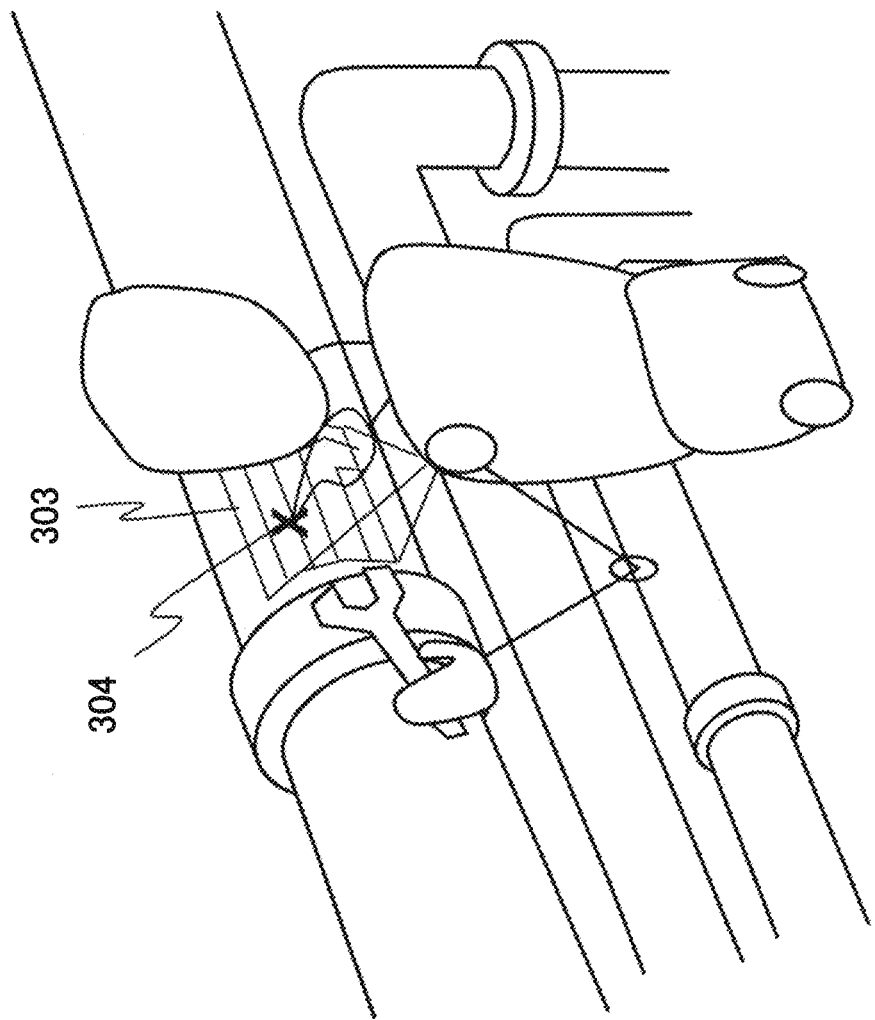
FIG. 25 is a conceptual diagram illustrating an example of the usage scene of the interface apparatus according to the third exemplary embodiment of the invention.
Figure 26:
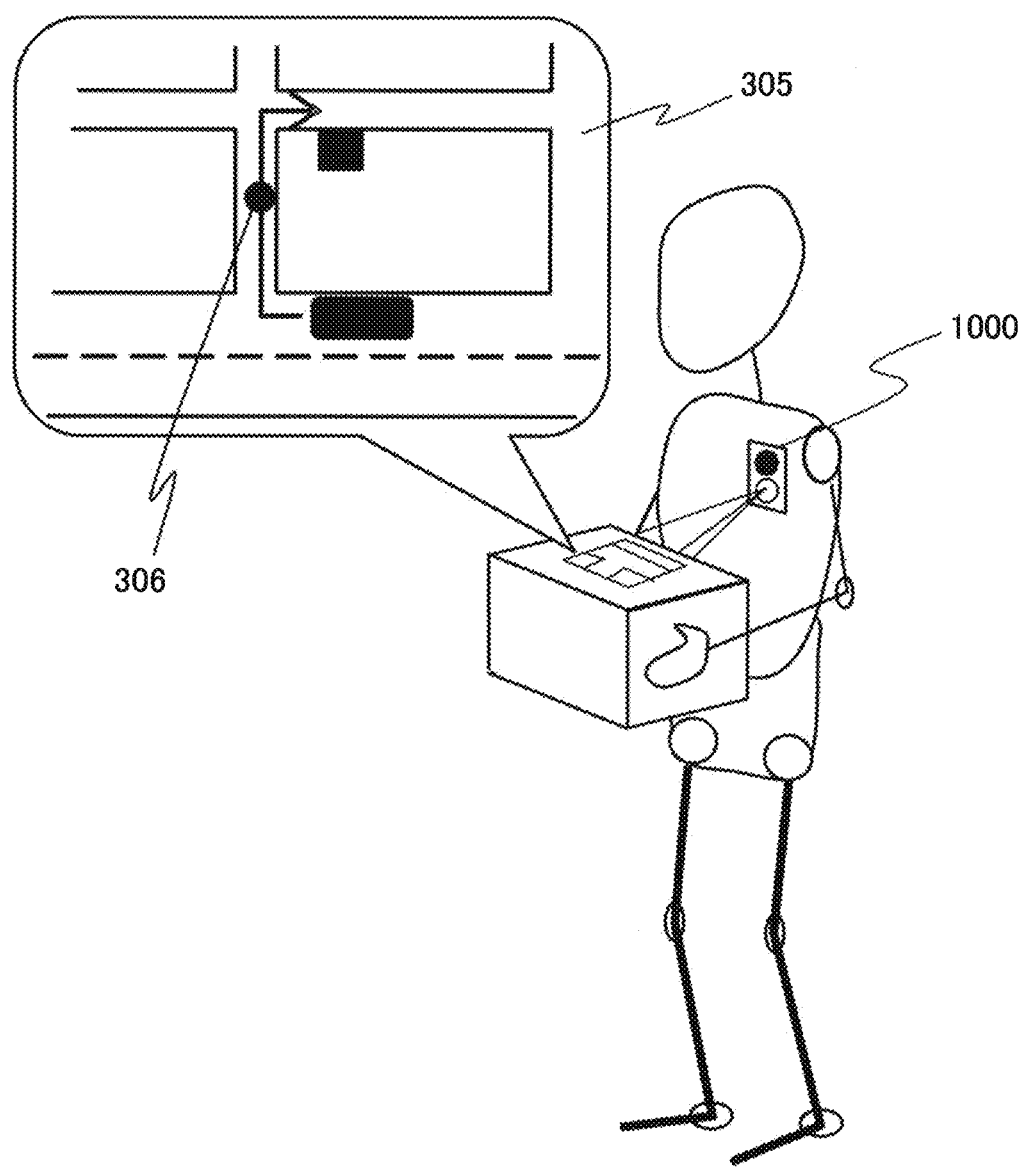
FIG. 26 is a conceptual diagram illustrating an example of the usage scene of the interface apparatus according to the third exemplary embodiment of the invention.
Figure 27:
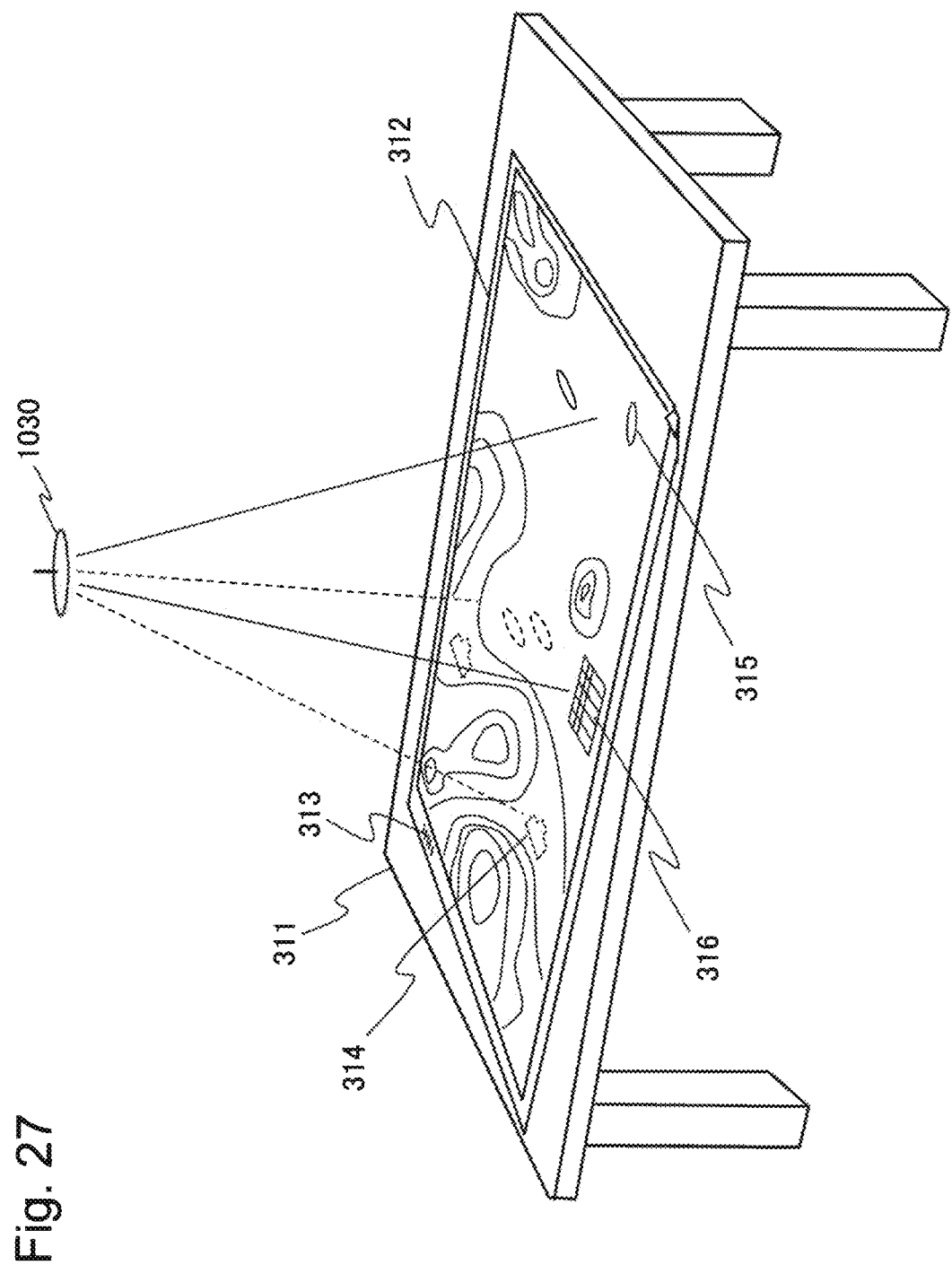
FIG. 27 is a conceptual diagram illustrating an example of the usage scene of the interface apparatus according to the third exemplary embodiment of the invention.

FIGS. 24 to 27 illustrate the usage scenes of the interface apparatus 100 according to this exemplary embodiment. In the examples illustrated in FIGS. 24, 25, and 26, it is assumed that an interface apparatus 1000 having the functions of the interface apparatus 100 is worn on the chest of the operator. In FIG. 27, it is assumed that an interface apparatus 1030 having the functions of the interface apparatus 100 is suspended from the ceiling. Similarly to the interface apparatus 100, each of the interface apparatuses 1000 and 1030 includes a control unit 101, an imaging unit 102, and a projection unit 103. The control unit 101, the imaging unit 102, and the projection unit 103 of the interface apparatuses 1000 and 1030 have the same function and relationship as the interface 100.

Usage Scene 1

Figure 24:
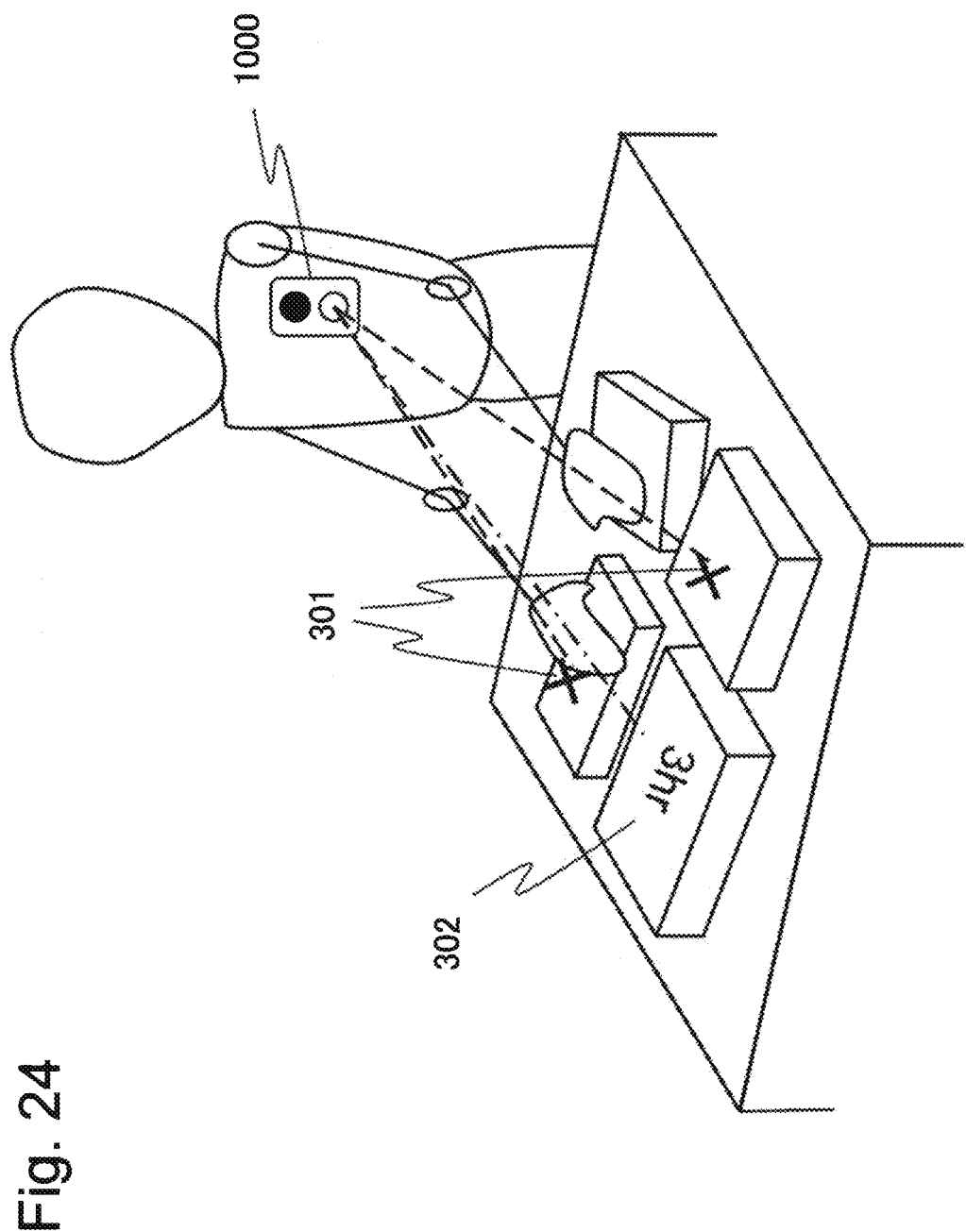
FIG. 24 is a conceptual diagram illustrating an example of a usage scene of the interface apparatus according to the third exemplary embodiment of the invention.

FIG. 24 illustrates Usage Scene 1 in which the operator displays or removes articles with reference to the expiration date of food handled in a store or a convenience store.

In FIG. 24, an image 301 is an image (for example, a red x-mark) that is projected onto an article that has passed the expiration date. In addition, an image 302 is a projection image (for example, green characters) that indicates the time until the expiration date. In the example illustrated in FIG. 24, the imaging unit 102 of the interface apparatus 1000 captures the image of a label indicating the expiration date of an article and the control unit 101 determines information about the expiration data recorded on the captured label. The control unit 101 provides an image information signal based on the determination result to the projection unit 103. The control unit 101 controls the projection unit 103 such that a red x-mark is projected to an article which has passed the expiration date and the time until the expiration date is projected in green to an article close to the expiration date. The projection unit 103 projects the red x-mark to the article which has passed the expiration date and projects the time until the expiration date to the article close to the expiration date in green under the control of the control unit 101. As illustrated in FIG. 24, no images are projected to articles that do not require attention to their expiration date. The operator who wears the interface apparatus 1000 can recognize information about the expiration date of each article on the basis of the information projected to each article.

As illustrated in FIG. 24, since the interface apparatus 1000 is worn on the chest, the operator can use both hands. In addition, in the example illustrated in FIG. 24, the operator does not check the label with an article in the hand. Therefore, the operator can complete an operation in a shorter time than the operator visually checks the label.

Usage Scene 2

FIG. 25 illustrates Usage Scene 2 in which the operator inspects and repairs pipes.

As illustrated in FIG. 25, the interface apparatus 1000 (not illustrated) that is worn on the chest of the operator projects a piping diagram 303 illustrating the vicinity of the place where the operation works to the pipe, for example, in green. The interface apparatus 1000 projects a mark 304, for example a red x-mark, to a portion to be inspected and repaired in the piping diagram 303. In the example illustrated in FIG. 25, the interface apparatus 1000 may be arranged with any position detection means, for example, a global positioning system (GPS). When the interface apparatus 1000 is arranged with a position detection means, the position detection means may be incorporated into hardware different from the imaging unit 102 or the projection unit 103. Next, an example in which the interface apparatus 1000 is arranged with the position detection means will be described.

The control unit 101 detects the position of the interface apparatus 1000 through the position detection means and recognizes the configuration of the pipes captured by the imaging unit 102. Then, the control unit 101 transmits an image signal suitable for the recognized portion to the projection unit 103 and controls the projection unit 103 such that projection light based on the transmitted image signal is projected.

In FIG. 25, a portion to be inspected or repaired is represented by a x-mark (red). However, a target pipe may be displayed in red. In addition, a UI including a portion for moving the position of the piping diagram 303 or for reducing and enlarging the piping diagram 303 may be projected in the vicinity of the piping diagram such that the operator operates, for example, a button or a scroll bar on the UI to obtain a desired image or information.

When the operator wears gloves, it is difficult to operate the UI on a touch panel of a general smart phone or a general tablet PC. In contrast, as in the example illustrated in FIG. 25, according to the interface apparatus 1000, the operator can operate the UI with gloves on. In addition, the operator can operate the UI projected from the projection unit 103, for example, when the hands of the operator are wet or are contaminated, in addition to when the operator wears gloves. In addition, the UI projected from the projection unit 103 can be operated by any object. In Usage Scene 2 illustrated in FIG. 25, the operator can use both hands, similarly to Usage Scene 1 illustrated in FIG. 24. Therefore, it is possible to improve work efficiency.

Usage Scene 3

FIG. 26 illustrates Usage Scene 3 in which a load is carried. In the example illustrated in FIG. 26, the interface apparatus 1000 projects a green map 305 indicating the vicinity of the current position of the operator to a load held with both hands of the operator. For example, the interface apparatus 1000 projects a red mark 306 on the green map 305 to inform the operator holding the load of the current position.

For example, the control unit 101 has a position detection means, such as a GPS, and the map 305 of the delivery destination is projected. Then, a red mark indicating the current position of the operator detected by the position detection means is projected to the map 305. The red mark is moved on the map 305 with the movement of the operator.

In the case of a map displayed on, for example, a smart phone or a tablet PC or a paper map, the operator needs to put down the load in order to handle the map. In contrast, according to the interface apparatus 1000 illustrated in FIG. 26, it is possible to continue to work, without performing an unnecessary operation of putting down a load.

Usage Scene 4

FIG. 27 illustrates Usage Scene 4 in which the interface apparatus is used as a conference system using a map. In FIG. 27, an interface apparatus 1030 that can be suspended from, for example, the ceiling is used.

It is assumed that two camps are confronted with each other on a map illustrated in FIG. 27. In the example illustrated in FIG. 27, the interface apparatus 1030 is suspended above a table 311. Then, the interface apparatus 1030 projects information to a map 312 on the table 311 and an interactive operation is performed using the projected information.

An identification code 313 for identifying the map, an image 314 (dotted line) indicating the information of one camp, an image 315 (solid line) indicating the information of the other camp, and an operation image 316 for interactively operating the information displayed on the map are displayed on the map 312 illustrated in FIG. 27. According to the interface apparatus 1030 illustrated in FIG. 27, for example, when the image 314 (dotted line) is displayed in red, the image 315 (solid line) is displayed in green, and the operation image 316 is displayed in blue, it is easy to distinguish the images.

In FIG. 27, when the map 312 is placed on the table 311, the imaging unit 102 of the interface apparatus 1030 captures the image of the map 312, reads the identification code 313, and identifies the map. At the same time, the control unit 101 of the interface apparatus 1030 reads the positions of four sides of the map 312 and sets coordinates such that information is accurately displayed. In addition, the control unit 101 sets the position for each color as described above, provides image signals corresponding to each color to the projection unit 103, and controls the projection unit 103 such that each image is projected. The projection unit 103 projects the images 314 and 315 indicating the information of each camp in red and blue, respectively, on the basis of the provided image information and projects the green operation image 316 to the map 312. The operator checks the state of the two camps with reference to the images 314 and 315 projected onto the map and performs an interactive operation corresponding to the state, using the operation image 316. For example, the interface apparatus 1030 may project information that is transmitted from a remote location through a network. In addition, for example, the interface apparatus 1030 may project information which has been written to an arbitrary position on the map by the operation of the operation image 316 by the operator.

As described above, according to the interface apparatus of the third exemplary embodiment of the invention, the projection unit having the projection function described in the first or second exemplary embodiment can accurately display each color. Therefore, the above-mentioned functions can be fulfilled and the same effect as described above can be obtained. As a result, the interface apparatus according to this exemplary embodiment has a small size and low power consumption and can display multiple colors with high resolution, without color breakup.

Related Art

Here, the related art will be described in order to facilitate the understanding of the projection apparatus and the interface apparatus according to the exemplary embodiments of the invention. The following related art does not form the exemplary embodiments of the invention and includes. However, the following related art includes the general principles applied to the exemplary embodiments of the invention.

As an example of an interface for performing an interactive operation, the Everywhere Displays Projector (hereinafter, referred to as an ED projector) is described in Background Art (NPL 1). The ED projector is an interface developed by International Business Machines Corporation (IBM) (registered trademark). The ED projector disclosed in NPL 1 detects the movement of the operator using a camera.

(NPL 1) C. Pinhanez, "Everywhere Displays Projector", [online], IBM, [searched on May 7, 2014], Internet (URL: http://www.researchibm.com/people/p/pinhanez/publications/ubicomp01. pdf)

A detection device or a projector for achieving an interface that performs an interactive operation is disclosed in the following NPL 2 to NPL 4:

(NPL 2) Kinect, Microsoft, [searched on Nov. 11, 2014], Internet (URL:http://www.microsoft.com/en-us/kinectfor-windows/develop/learn.as px);

(NPL 3) OASIS, Intel, [searched on Nov. 11, 2014], Internet (URL:http://ils.intel-research.net/uploads/papers/OASIS-deanon.pdf); and (NPL 4) LuminAR, MIT, [searched on Nov. 11, 2014], Internet (URL:http://fluid.media.mit.edu/sites/default/files/2010-10-03-luminar_ui st10_demo.pdf).

Kinect (registered trademark) disclosed in NPL 2 is an apparatus developed by Microsoft Corporation (registered trademark). Object-Aware Situated Interactive System (OASIS) disclosed in NPL 3 is a technique developed by Intel Corporation (registered trademark). In Kinect or OASIS, the movement of an object is detected by a camera or a depth measurement device. LuminAR (Augmented Reality) disclosed in NPL 4 is an apparatus developed by Massachusetts Institute of Technology (MIT). In LuminAR, a projector projects a UI and a camera captures an operation for the UI. LuminAR differs from the ED projector in that a small projector and a camera are arranged at the leading end of a robot arm which is freely movable.

The projector used in the interface system according to the related art uses an intensity-modulation-type modulation element. For example, a liquid crystal monitor of a desktop personal computer (PC) or a notebook PC operates in an intensity modulation manner.

The phase modulation type is less widespread than the intensity modulation type for the following reasons even though it has the advantages described in Background Art.

A first reason is that a light source which emits coherent light, such as a laser beam, is required. When a laser is used as the light source, a kind of noise which is called a speckle is generated. As a result, a visual problem occurs or additional signal processing, such as Fourier transform, is required.

A second reason is that, when a natural image is projected, display is performed by almost all of the pixels and superiority in power efficiency is removed.

A third reason is that pixels on a screen and pixels on a modulation element are not matched with each other as in the intensity modulation type and the position of each color on the screen is changed. Therefore, when time division is performed in the phase modulation type, the matching (referred to as convergence) between the positions of each color on the screen is required.

For these reasons, the phase modulation type is applied for limited purposes, such as a communication switch or laser beam machining.

There is an example in which a phase-modulation-type projector for a natural image is commercialized (E. Buckley, "Holographic Laser Projection Technology", SID'08, Technical Digest, 2008, pp. 1074-1079). However, the phase-modulation-type projector is not widespread since it does not have advantages over the intensity-modulation-type projector for the above-mentioned reasons.

According to the exemplary embodiments of the invention, it is possible to achieve a projection apparatus and an interface apparatus that have a small size and low power consumption and can display multiple colors with high resolution, without color breakup, which has not been achieved by the above-mentioned related art.

The invention has been described above with reference to the exemplary embodiments. However, the invention is not limited to the above-described exemplary embodiments. Various modifications and changes in the structure or details of the invention, which can be understood by those skilled in the art, can be made without departing from the scope of the invention.

This application claims priority based on Japanese Patent Application No. 2014-255666 filed on Dec. 18, 2014, the disclosure of which is incorporated herein by reference in its entirety.

REFERENCE SIGNS LIST

11 LIGHT SOURCE
13 MODULATION MEANS
15 UNNECESSARY COMPONENT REMOVAL MEANS
17 PROJECTION MEANS
100 INTERFACE APPARATUS
101 CONTROL UNIT
102 IMAGING UNIT
103 PROJECTION UNIT
110 LASER LIGHT SOURCE
111 FIRST LASER LIGHT SOURCE
112 SECOND LASER LIGHT SOURCE
120 COLLIMATOR LENS
121 FIRST COLLIMATOR LENS
122 SECOND COLLIMATOR LENS
130 MODULATION ELEMENT
131 DISPLAY SURFACE
131R, 131G, 131B DISPLAY REGION
140 LIGHT SHIELDING STRUCTURE
141 LIGHT SHIELD
142 LIGHT ABSORBER
150, 151, 152, 153 UNNECESSARY COMPONENT REMOVAL
160 MEANS
160 COMBINATION OPTICAL SYSTEM
171, 172 FOURIER TRANSFORM LENS
175 LIGHT SHIELD
179 CONVEX LENS
180, 181, 182 PROJECTION LENS
511 DICHROIC MIRROR
512 MIRROR
515 LIGHT ABSORBER
521 FIRST DICHROIC MIRROR
522 SECOND DICHROIC MIRROR
523 MIRROR
525 FIRST LIGHT ABSORBER
526 SECOND LIGHT ABSORBER
531 FIRST DICHROIC MIRROR
532 SECOND DICHROIC MIRROR
533 THIRD DICHROIC MIRROR
534 MIRROR
535 FIRST LIGHT ABSORBER
536 SECOND LIGHT ABSORBER
1010, 1020, 1030 INTERFACE APPARATUS
1012, 1022 LENS UNIT
1013, 1023 PROJECTION LENS UNIT
1710, 1720, 1731, 1732 FOURIER TRANSFORM LENS
1711, 1721 CONVEX LENS
1712, 1722, 1723 CONCAVE LENS
1731 FIRST FOURIER TRANSFORM LENS
1732 SECOND FOURIER TRANSFORM LENS

What is claimed is:

1. A projection apparatus comprising:
a light source that emits laser beams of a plurality of colors collimated by a plurality of collimating lenses corresponding to each of the laser beams of the plurality of colors;
a light modulator that has a phase-modulation-type modulation element including a display surface which includes a plurality of display regions allocated to each color of the laser beams of the plurality of colors emitted from the light source and modulates each of the laser beams of the plurality of colors on each of the plurality of display regions allocated to each color;

a light remover that removes unnecessary components, which are generated by the modulation of laser beams of other colors mixed in the plurality of display regions allocated to the laser beams of the plurality of colors, from each of the laser beams of the plurality of colors modulated by the light modulator using wavelength selection; and a projector that projects light from which the unnecessary components have been removed by the light remover, wherein the light source emits each of the laser beams of the plurality of colors to each of the plurality of display regions allocated to each color, the light modulator modulates each of the laser beams of the plurality of colors on each of the plurality of display regions allocated to each color, and the light remover is arranged between the light modulator and the projector, and removes the unnecessary components protruded from each of the plurality of display regions to adjacent display regions.

2. The projection apparatus according to claim 1, wherein the light remover includes:
  a mirror that reflects the laser beams of the plurality of colors;
  at least one dichroic mirror that selectively transmits a laser beam of any color among the laser beams of the plurality of colors reflected by the mirror and the light modulator; and
  a light absorber that absorbs the unnecessary components removed through the at least one dichroic mirror.

3. The projection apparatus according to claim 1, wherein the projector includes:
  a Fourier transform lens that Fourier-transforms the light from which the unnecessary components have been removed by the light remover, and
  a projection lens that projects the light Fourier-transformed by the Fourier transform lens, and
  a light shield that shields high-order light included in the laser beam Fourier-transformed by the Fourier transform lens is arranged at a focus position of the Fourier-transformed laser beam.

4. The projection apparatus according to claim 3, wherein the Fourier transform lens has a structure in which a convex lens with low dispersion is arranged close to the modulation element and a concave lens with high dispersion is arranged close to the projection lens, and the Fourier transform lens is arranged such that the laser beams of each color have different focuses on the convex lens side and the laser beams of each color have the same focus on the concave lens side.

5. The projection apparatus according to claim 1, wherein the light remover has a structure in which band-pass filters that selectively transmit the laser beams of colors corresponding to each display region for modulating any one of the laser beams of the plurality of colors are arranged on the display surface of the modulation element.

6. The projection apparatus according to claim 5, wherein the projector includes:
  a Fourier transform lens that Fourier-transforms the light from which the unnecessary components have been removed by the light remover; and
  a projection lens that projects the light Fourier-transformed by the Fourier transform lens,
  the Fourier transform lens has a structure in which first and second concave lenses with high dispersion are arranged close to the modulation element and the projection lens, respectively, and a convex lens with low dispersion is arranged between the first and second concave lenses, and
  the Fourier transform lens is arranged such that focal lengths from both surfaces close to the modulation element and the projection lens are equal to each other.

7. The projection apparatus according to claim 6, wherein the Fourier transform lens and the projection lens are arranged for each of the laser beams of each color modulated by the modulation element.

8. The projection apparatus according to claim 1, further comprising:
  a light shielding structure including a light shielding portion that is arranged in a frame shape in periphery of the modulation element, has an inclined surface which is inclined outward with respect to the display surface of the modulation element, and reflects the laser beams incident on the inclined surface and a light absorption portion that absorbs the laser beams reflected by the light shielding portion.

9. The projection apparatus according to claim 1, wherein the light source includes:
  a first laser light source that emits a first laser beam; and
  a second laser light source that emits a second laser beam,
  the projector includes a Fourier transform lens that performs Fourier transform for the light from which the unnecessary components have been removed by the light remover,
  the display surface of the light modulator includes a first display region for modulating the first laser beam emitted from the first laser light source and a second display region for modulating the second laser beam emitted from the second laser light source, and
  the light remover includes:
  a light absorber that absorbs the unnecessary components;
  a mirror that reflects the first and second laser beams modulated by the second display region; and
  a dichroic mirror that reflects the second laser beam reflected by the mirror to the Fourier transform lens, transmits the first laser beam reflected by the mirror to the light absorber, transmits the first laser beam modulated by the first display region to the Fourier transform lens, and reflects the second laser beam modulated by the first display region to the light absorber.

10. An interface apparatus comprising:
  a projection apparatus including a light source that emits laser beams of a plurality of colors collimated by a plurality of collimating lenses corresponding to each of the laser beams of the plurality of colors, a light modulator that has a phase-modulation-type modulation element including a display surface which includes a plurality of display regions allocated to each color of the laser beams of the plurality of colors emitted from the light source and modulates each of the laser beams of the plurality of colors on each of the plurality of display regions allocated to each color, a light remover that removes unnecessary components, which are generated by the modulation of laser beams of other colors mixed in the plurality of display regions allocated to the laser beams of the plurality of colors, from each of the laser beams of the plurality of colors modulated by the light modulator using wavelength selection; and a projector that projects light from which the unnecessary components have been removed by the light remover, a camera that captures a region including an image projected by the projection apparatus; and a controller configured to include a memory and a central processing unit, the controller providing image information corresponding to an operation performed for the image in the region captured by the camera to the projection apparatus and controlling the projection apparatus such that the image information is projected, wherein the light source emits each of the laser beams of the plurality of colors to each of the plurality of display regions allocated to each color, the light modulator modulates each of the laser beams of the plurality of colors on each of the plurality of display regions allocated to each color, and the light remover is arranged between the light modulator and the projector, and removes the unnecessary components protruded from each of the plurality of display regions to adjacent display regions.

* * * * *